US012690084B2

(12) United States Patent
Godin et al.

(10) Patent No.: US 12,690,084 B2
(45) Date of Patent: Jul. 21, 2026

(54) NETWORK METHOD FOR SMALL DATA TRANSMISSION TERMINATION AND SIGNALING

(71) Applicant: Nokia Technologies Oy, Espoo (FI)

(72) Inventors: Philippe Godin, Massy (FR); Daniela Laselva, Aalborg (DK); Subramanya Chandrashekar, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 289 days.

(21) Appl. No.: 18/256,371

(22) PCT Filed: Dec. 7, 2021

(86) PCT No.: PCT/EP2021/084564

§ 371 (c)(1),
(2) Date: Jun. 7, 2023

(87) PCT Pub. No.: WO2022/128617

PCT Pub. Date: Jun. 23, 2022

(65) Prior Publication Data

US 2024/0023186 A1 Jan. 18, 2024

(30) Foreign Application Priority Data

Dec. 19, 2020 (IN) ............................. 202041055339

(51) Int. Cl.
*H04W 76/20* (2018.01)
*H04W 28/02* (2009.01)
*H04W 76/30* (2018.01)

(52) U.S. Cl.
CPC ....... *H04W 76/20* (2018.02); *H04W 28/0278* (2013.01); *H04W 76/30* (2018.02)

(58) Field of Classification Search
None
See application file for complete search history.

(56) References Cited

U.S. PATENT DOCUMENTS

2019/0342800 A1 11/2019 Sirotkin et al.
2019/0357272 A1 11/2019 Lim et al.
2020/0037210 A1 1/2020 Rugeland et al.
2020/0137564 A1 4/2020 Liu et al.
(Continued)

FOREIGN PATENT DOCUMENTS

WO 2018/175809 A1 9/2018
WO 2020/189958 A1 9/2020
(Continued)

OTHER PUBLICATIONS

"Small Data Transmission in Inactive State" by Jincan Xin, Sen Xu, Xiaoyu Yang, Hua Zhang and Shangkun Xiong. 2021 13th International Conference on Advanced Infocomm Technology (ICAIT) / IEEE. Oct. 15-18, 2021. (Year: 2021).*
(Continued)

*Primary Examiner* — Xavier S Wong
(74) *Attorney, Agent, or Firm* — McCarter & English, LLP

(57) ABSTRACT

Techniques of performing multi-shot SDT transactions include determining, by a distributed unit (DU) of a base station gNB) in a wireless network, a condition for terminating of a multi-shot small data transmission (SDT) and provide an indication of the termination to an entity within the wireless network.

19 Claims, 14 Drawing Sheets

(56) References Cited

U.S. PATENT DOCUMENTS

| | | | | |
|---|---|---|---|---|
| 2022/0124555 | A1 | 4/2022 | Godin | |
| 2023/0075703 | A1* | 3/2023 | Zhu | H04W 76/27 |
| 2023/0189380 | A1* | 6/2023 | Palat | H04W 76/11 370/329 |
| 2023/0397291 | A1* | 12/2023 | Huang | H04L 49/90 |
| 2024/0163760 | A1* | 5/2024 | Ahluwalia | H04W 36/0033 |
| 2025/0193959 | A1* | 6/2025 | Chen | H04W 72/23 |

FOREIGN PATENT DOCUMENTS

| | | | |
|---|---|---|---|
| WO | 2020/191059 | A1 | 9/2020 |
| WO | 2022/074502 | A1 | 4/2022 |
| WO | 2022/078867 | A1 | 4/2022 |
| WO | 2022/083921 | A1 | 4/2022 |

OTHER PUBLICATIONS

"3rd Generation Partnership Project; Technical Specification Group Radio Access Network; NG-RAN Architecture description (Release 16)", 3GPP TS 38.401, V16.3.0, Sep. 2020, pp. 1-78.
"3rd Generation Partnership Project; Technical Specification Group Radio Access Network; NG-RAN; NR user plane protocol (Release 16)", 3GPP TS 38.425, V16.2.0, Sep. 2020, pp. 1-25.
"3rd Generation Partnership Project; Technical Specification Group Radio Access Network; NG-RAN; Xn application protocol (XnAP) (Release 16)", 3GPP TS 38.423, V16.3.0, Sep. 2020, pp. 1-451.
"3rd Generation Partnership Project; Technical Specification Group Radio Access Network; NG-RAN; F1 application protocol (F1AP) (Release 16)", 3GPP TS 38.473, V16.3.1, Oct. 2020, pp. 1-455.
"3rd Generation Partnership Project; Technical Specification Group Radio Access Network; NG-RAN; E1 Application Protocol (E1AP) (Release 16)", 3GPP TS 38.463, V16.3.0. Sep. 2020, pp. 1-235.
"Work Item on NR smalldata transmissions in INACTIVE state", 3GPP TSG RAN Meeting #86, RP-193252, Agenda: 9.1.2, ZTE Corporation, Dec. 9-12, 2019, 4 pages.
"SDT mechanism on RRC/non-RRC based approaches and RACH requirements", 3GPP TSG RAN WG2 Metting #111-e, R2-2006713, Agenda: 8.6.2, Intel Corporation, Aug. 17-28, 2020, 10 pages.
"Radio bearer configuration for SDT considering UE context relocation and CU/DU split", 3GPP TSG RAN WG2 Meeting #111-e. R2-2006714, Agenda: 8.6.2, Intel Corporation, Aug. 17-28, 2020, 6 pages.
"Summary of email discussion [Post111-e][926][SmallData] Context Fetch", 3GPP TSG-RAN Meeting #112-e. R2-2009967, Agenda: 8.6.3, Ericsson, Nov. 2-13, 2020, pp. 1-22.
"3rd Generation Partnership Project; Technical Specification Group Radio Access Network; NR; NR and NG-RAN Overall Description; Stage 2 (Release 16)", 3GPP TS 38.300, V16.3.0. Sep. 2020, pp. 1-148.
"3rd Generation Partnership Project; Technical Specification Group Radio Access Networkc; NR; Radio Resource Control (RRC) Protocol specification (Release 16)", 3GPP TS 38.331, V16.2.0, Sep. 2020, pp. 1-921.
Min Oh et al., "An Efficient Small Data Transmission Scheme in the 3GPP NB-IoT System", IEEE Communicatio Letters, vol. 21, No. 3. Mar. 2017, pp. 660-863.
International Search Report and Written Opinion received for corresponding Patent Cooperation Treaty Application No. PCT/EP2021/084564, dated Mar. 31, 2022, 14 pages.
"Details on RACH specific schemes", 3GPP TSG-RAN WG2 Meeling #112 Electronic, R2-2009799, Agenda: 8.6.4, Nokia. Nov. 2-13, 2020, 4 pages.
Office action received for corresponding Japanese Patent Application No. 023-637382, dated Aug. 13, 2024, 4 pages of office action and 7 pages of translation available.
"3rd Generation Partnership Project, Technical Specification Group Radio Access Network; NG-RAN; Architecture description (Release 17)", 3GPP TS 38.401 V17.5.0, Jun. 2023, pp. 1-123.
"3rd Generation Partnership Project; Technical Specification Group Radio Access Network; NG-RAN; F1 application protocol (F1AP) (Release 17)", 3GPP TS 38.473, V17.5.0, Jun. 2023, pp. 1-662.
"3rd Generation Partnership Project; Technical Specification Group Radio Access Network; NR, NR and NG-RAN Overall Description; Stage 2 (Release 17)", 3GPP TS 38.300, V17.5.0, Jun. 2023, pp. 1-211.
"3rd Generation Partnership Project, Technical Specification Group Radio Access Network; NG-RAN; Xn application protocol (XnAP) (Release 17)", 3GPP TS 38.423, V17.5.0, Jun. 2023, pp. 1-688.
Office action received for corresponding Japanese Patent Application No. 2023-537382, dated Mar. 31, 2025, 2 pages of office action and 6 pages of summary & translation available.

* cited by examiner

1200

1210

Receive,by a distributed unit of a target base station (target gNB-DU) from a user equipment (UE) within a wireless network, during a multi-shot SDT transaction, a UL SDT packet

1220

Determine whether the UL SDT packet is a terminal UL SDT packet

1230

In response to the determination that the subsequent UL SDT packet is the terminal UL SDT packet, generate termination data indicating a termination of the multi-shot SDT transaction; and transmit the termination data to a central unit of a base station (gNB-CU) along a path within the wireless network, the termination data indicating a termination of the SDT transaction

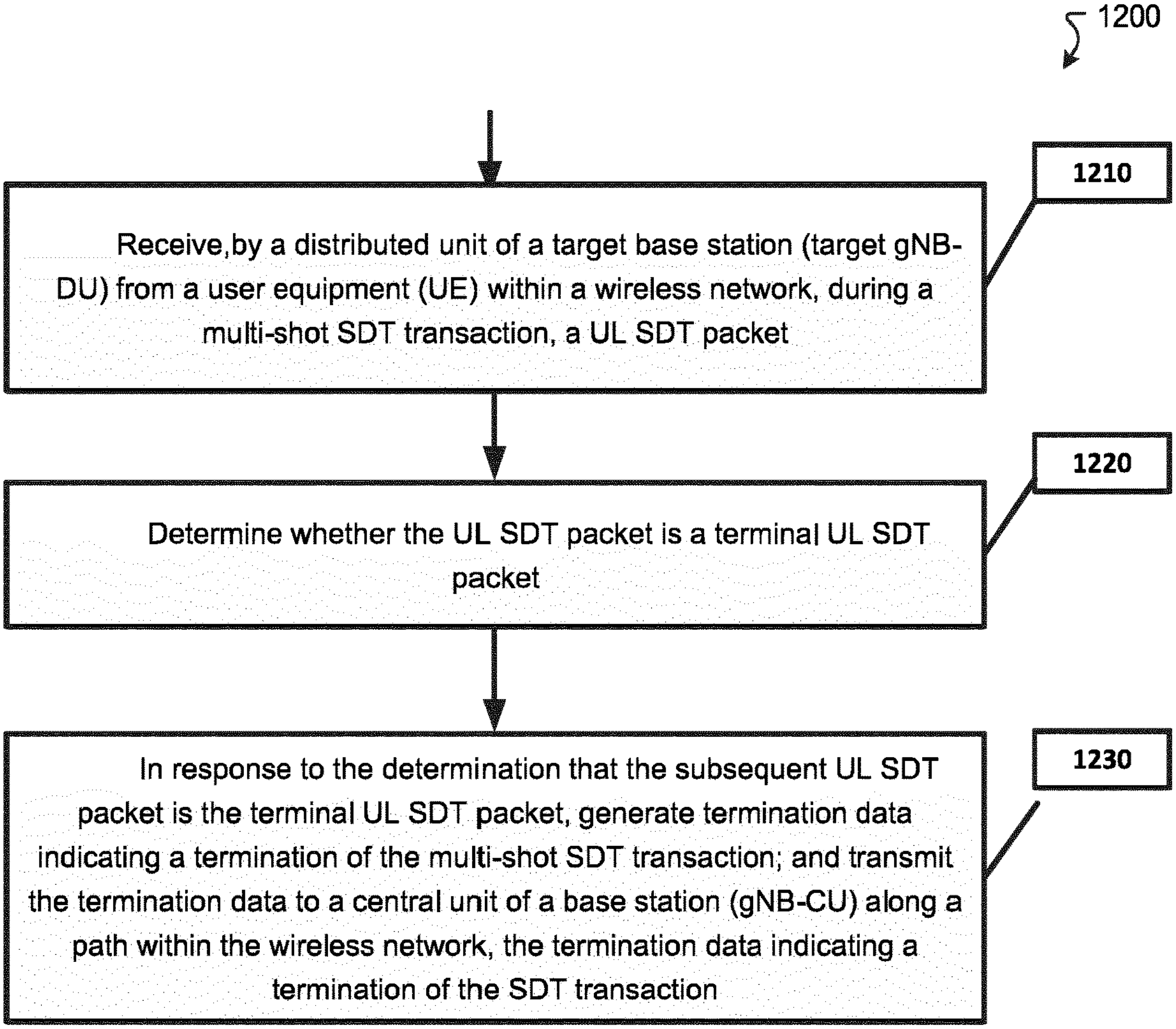

FIG. 12

Transmit, by a user equipment (UE) to a distributed unit of a base station (gNB-DU), one or more uplink (UL) small data transmission (SDT) packets of a multi-shot SDT transaction

1310

After transmitting the sequence of UL SDT packets, receive, from the gNB-DU, radio resource control release (RRC_RELEASE) data indicating that the multi-shot SDT transaction is terminated, the terminating of the multi-shot SDT transaction being determined by the gNB-DU

1320

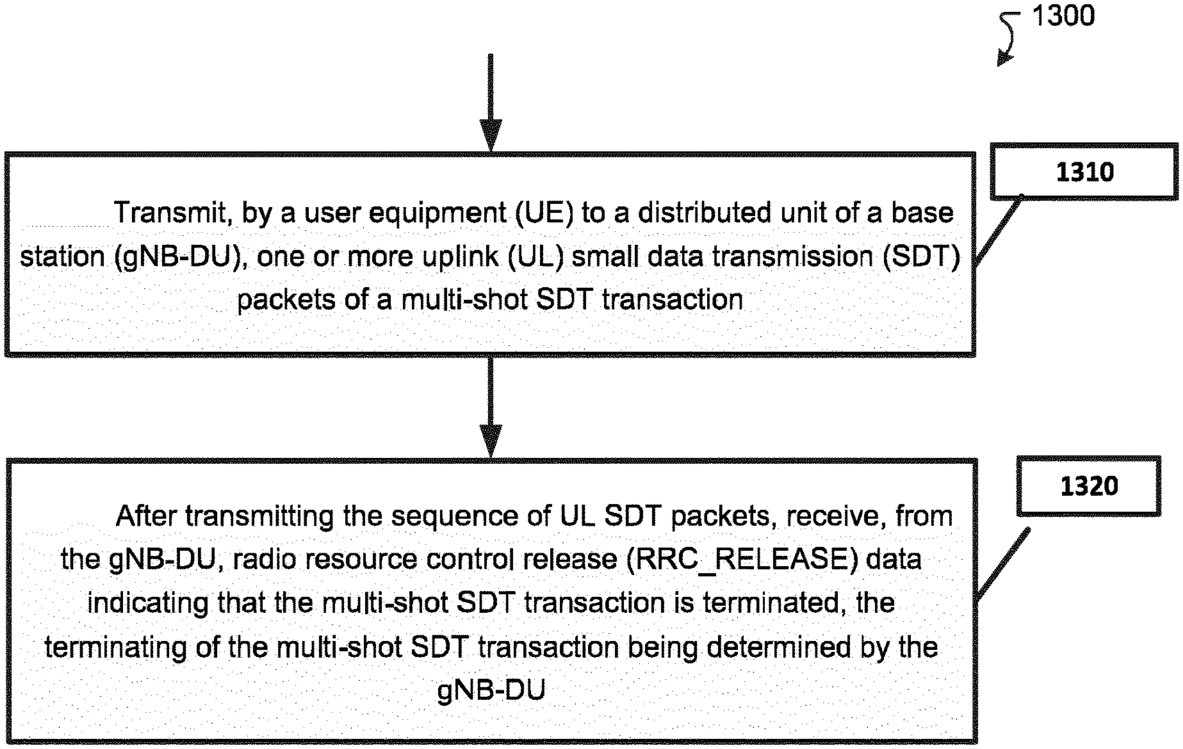

FIG. 13

NETWORK METHOD FOR SMALL DATA TRANSMISSION TERMINATION AND SIGNALING

RELATED APPLICATION

This application was originally filed as PCT Application No. PCT/EP2021/084564, filed on 7 Dec. 2021, which claims priority from India provisional Application No. 202041055339, filed on 19 Dec. 2020, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a distributed unit of a target base station (target gNB-DU) from a user equipment (UE) within a wireless network during a multi-shot SDT transaction, a UL SDT packet. The method further includes, determining whether the UL SDT packet is a terminal UL SDT packet. The method further includes, in response to the determination that the UL SDT packet is the terminal UL SDT packet, generating termination data indicating a termination of the multi-shot SDT transaction; and transmitting the termination data to a central unit of a base station (gNB-CU) along a path within the wireless network, the termination data indicating a termination of the SDT transaction.

According to an example implementation, an apparatus includes at least one processor and at least one memory including computer program code, the at least one memory and the computer program code configured to, with the at least one processor, cause the apparatus at least to receive, by a distributed unit of a target base station (target gNB-DU) from a user equipment (UE) within a wireless network during a multi-shot SDT transaction, a UL SDT packet. The apparatus is further caused to determine whether the UL SDT packet is a terminal UL SDT packet. The apparatus is further caused to, in response to the determination that the UL SDT packet is the terminal UL SDT packet, generate termination data indicating a termination of the multi-shot SDT transaction; and transmit the termination data to a central unit of a base station (gNB-CU) along a path within the wireless network, the termination data indicating a termination of the SDT transaction.

According to an example implementation, an apparatus includes means for receiving, by a distributed unit of a target base station (target gNB-DU) from a user equipment (UE) within a wireless network during a multi-shot SDT transaction, a UL SDT packet. The apparatus further includes, determining whether the UL SDT packet is a terminal UL SDT packet. The apparatus further includes means for, in response to the determination that the UL SDT packet is the terminal UL SDT packet, generating termination data indicating a termination of the multi-shot SDT transaction; and transmitting the termination data to a central unit of a base station (gNB-CU) along a path within the wireless network, the termination data indicating a termination of the SDT transaction.

According to an example implementation, a computer program product includes a computer-readable storage medium and storing executable code that, when executed by at least one data processing apparatus, is configured to cause the at least one data processing apparatus to receive, by a distributed unit of a target base station (target gNB-DU) from a user equipment (UE) within a wireless network during a multi-shot SDT transaction, a UL SDT packet. The at least one data processing apparatus is further caused to determine whether the UL SDT packet is a terminal UL SDT packet. The at least one data processing apparatus is further caused to, in response to the determination that the UL SDT packet is the terminal UL SDT packet, generate termination data indicating a termination of the multi-shot SDT transaction; and transmit the termination data to a central unit of a base station (gNB-CU) along a path within the wireless network, the termination data indicating a termination of the SDT transaction.

According to an example implementation, a method includes transmitting, by a user equipment (UE) to a distributed unit of a base station (gNB-DU), one or more uplink (UL) small data transmission (SDT) packets of a multi-shot SDT transaction. The method also includes, after transmitting the one or more UL SDT packets, receiving, from the gNB-DU, radio resource control release (RRC_RELEASE) data indicating that the multi-shot SDT transaction is closed, the closing of the multi-shot SDT transaction being determined by the gNB-DU.

According to an example implementation, an apparatus includes at least one processor and at least one memory including computer program code, the at least one memory and the computer program code configured to, with the at least one processor, cause the apparatus at least to transmit, by a user equipment (UE) to a distributed unit of a base station (gNB-DU), one or more uplink (UL) small data transmission (SDT) packets of a multi-shot SDT transaction. The apparatus is further caused to, after transmitting the one or more UL SDT packets, receive, from the gNB-DU, radio resource control release (RRC_RELEASE) data indicating that the multi-shot SDT transaction is closed, the closing of the multi-shot SDT transaction being determined by the gNB-DU.

According to an example implementation, an apparatus includes means for transmitting, by a user equipment (UE) to a distributed unit of a base station (gNB-DU), one or more uplink (UL) small data transmission (SDT) packets of a multi-shot SDT transaction. The apparatus also includes means for, after transmitting the one or more UL SDT packets, receiving, from the gNB-DU, radio resource control release (RRC_RELEASE) data indicating that the multi-shot SDT transaction is closed, the closing of the multi-shot SDT transaction being determined by the gNB-DU.

According to an example implementation, a computer program product includes a computer-readable storage medium and storing executable code that, when executed by at least one data processing apparatus, is configured to cause the at least one data processing apparatus to transmit, by a user equipment (UE) to a distributed unit of a base station (gNB-DU), one or more uplink (UL) small data transmission (SDT) packets of a multi-shot SDT transaction. The at least one data processing apparatus is also caused to, after transmitting the one or more UL SDT packets, receive, from the gNB-DU, radio resource control release (RRC_RELEASE) data indicating that the multi-shot SDT transaction is closed, the closing of the multi-shot SDT transaction being determined by the gNB-DU.

The details of one or more examples of implementations are set forth in the accompanying drawings and the description below. Other features will be apparent from the description and drawings, and from the claims.

BRIEF DESCRIPTION OF THE DRAWINGS

FIG. 12 is a flow chart illustrating a process of terminating a multi-shot SDT transaction according to an example implementation.

FIG. 13 is a flow chart illustrating a process of terminating a multi-shot SDT transaction according to an example implementation.

DETAILED DESCRIPTION

Figure 1:
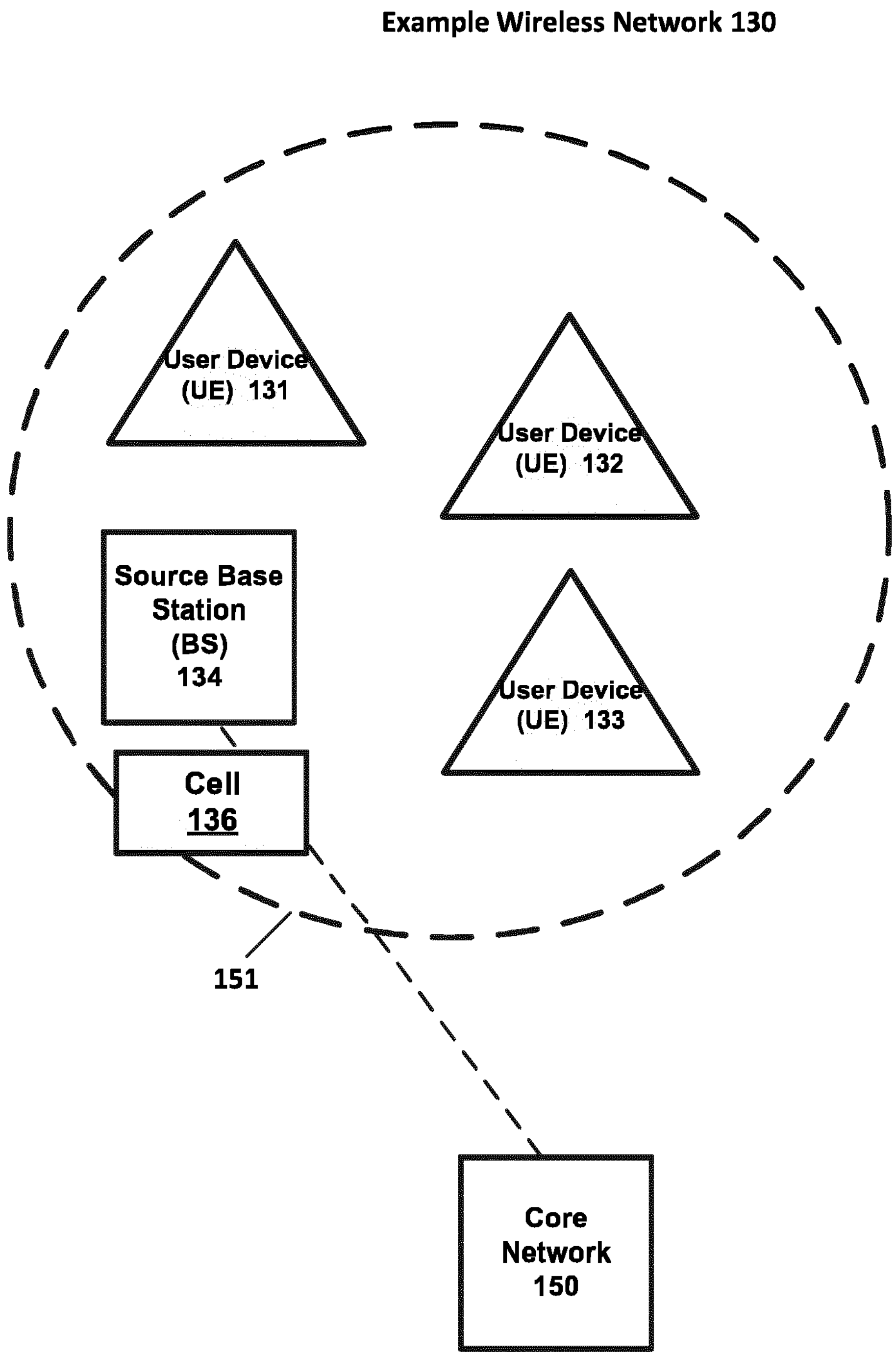
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. In 5G, core network 150 may be an Access Management Function (AMF).

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Some IoT applications involve an exchange of relatively small amounts of data. For example, metering and alarm applications typically involve a small amount of mobile originated (MO) data, while various queries, notifications of updates, enabling actuators, and the like involve a small amount of mobile terminated (MT) data. Unfortunately, establishing a connection between a mobile device and network involves a large overhead (relative to the small amount of data). In some cases, a UE may be placed in an inactive state that represents a middle ground between a connected state and an idle state, e.g., RRC_INACTIVE state.

Allowing data transmission to or from a UE (or other type of mobile device) that is in RRC_INACTIVE state makes sense if the UE has a small amount of data to transmit and a radio access network (RAN) has no data or only a small amount of data to transmit while the UE is in the state. If either the UE or RAN has subsequent data to transmit, the overhead to move to an active connected state (e.g., RRC_CONNECTED mode) may be justified, so that the data can be sent with dedicated resources.

When a UE is in the RRC_INACTIVE state, an inactive radio network temporary identifier (I-RNTI) is allocated by an anchor gNB (i.e., the last serving gNB) to a UE that is being moved to the RRC_INACTIVE state. It is configured as part of the RRC release message with the Suspend Configuration, and the UE transmits it within the RRC resume request message. The I-RNTI (40 bits) may include means to identify both the UE and the last serving gNB; accordingly, the I-RNTI may include a UE ID part and gNB ID part. The algorithm used to construct the I-RNTI is specific to a vendor and this includes decision on the position within the I-RNTI and number of bits used for UE ID and gNB ID parts.

In some implementations, the UE identifier is a SDT UE ID. In this case, the I-RNTI is a special case of such an identifier.

For 3GPP Rel-17, a work item has been initiated entitled "NR small data transmissions in INACTIVE state" [RP-193252]. Three solutions for enabling Small Data Transmission (SDT) triggered by an Uplink transmission in a 5G NR system are therein proposed with focus on the first UL transmission:

4-step RACH based SDT: User plane (UP) or Control Plane (CP) data transmitted in Msg3 of a 4-step RACH procedure (i.e. small payload multiplexed with an RRC Connection Resume Request).

2-step RACH based SDT: UP (or CP) data transmission happens with MsgA of a 2-step RACH procedure and specifically on the PUSCH resources that are pre-configured by the gNB and broadcast in System Information with associated physical transmission parameters.

Configured Grant based SDT: A UE in RRC_CONNECTED state can receive a CG type1 configuration that indicates the specific pre-configured PUSCH resources to be used for UL data transmission. This (type of) CG configuration can also be configured to be used when the UE is in RRC_INACTIVE state as long as its timing advance is valid.

Figure 2:
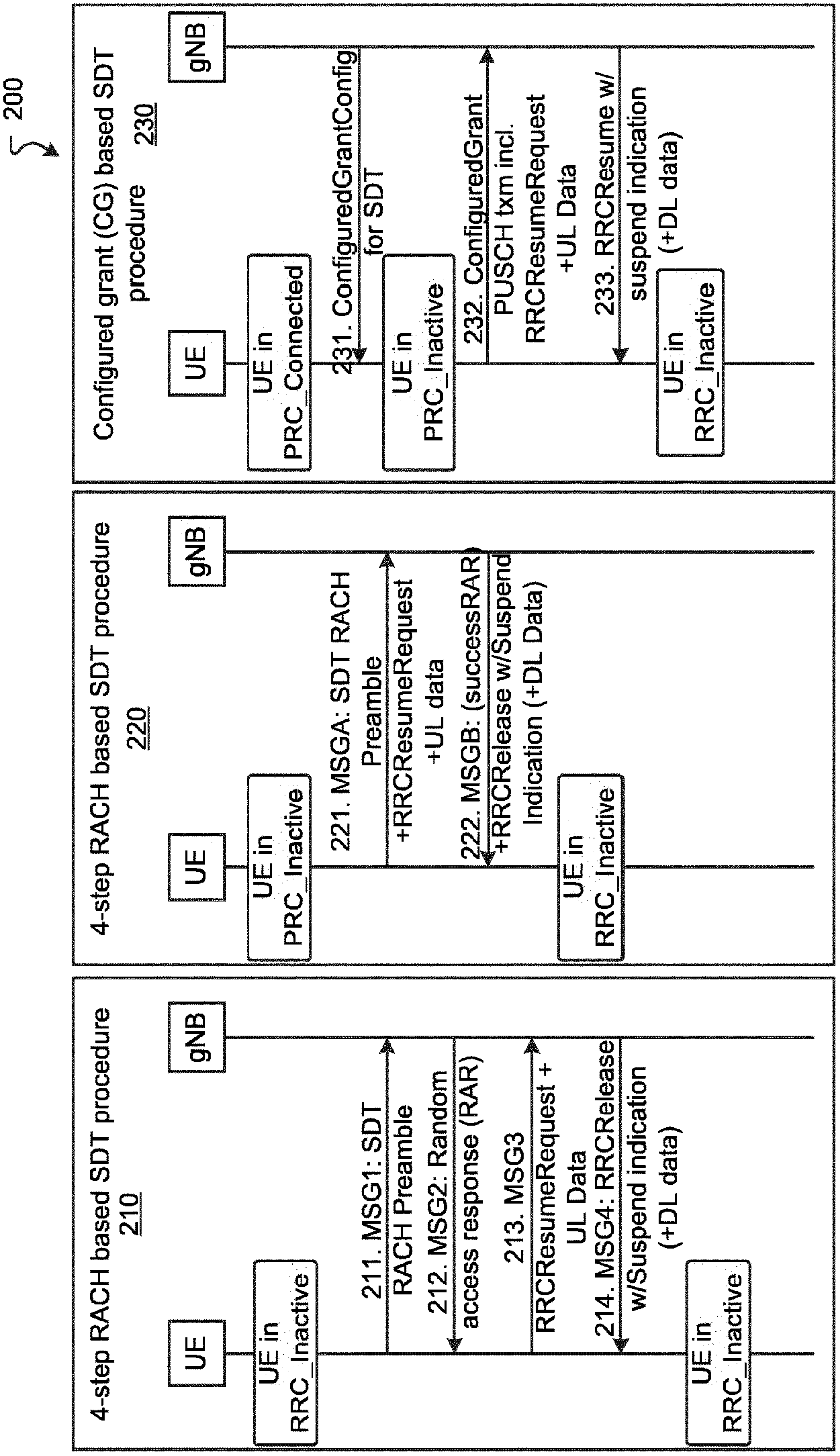
FIG. 2 is a diagram illustrating three SDT solutions: 4-step RACH based SDT, 2-step RACH based SDT, and CG based SDT according to an example implementation.

A radio resource control (RRC)-based approach is assumed in the above-described solutions for enabling SDT and is shown in FIG. 2. FIG. 2 is a diagram 200 illustrating three SDT solutions: 4-step RACH based SDT 210, 2-step RACH based SDT 220, and CG based SDT 230.

In the 4-step RACH based SDT 210, at 211 the user equipment (UE) sends as a MSG1, an SDT RACH preamble to a base station (gNB). At 212, the gNB sends, as a MSG2, a random access response (RAR) to the UE. At 213, the UE sends, as a MSG3, an RRC_RESUME_REQUEST message and any uplink (UL) data to the gNB. At 214, the gNB sends, as a MSG4, an RRC_RELEASE with a suspend indication and any downlink (DL) data to the UE.

In the 2-step RACH based SDT 220, at 221, the UE sends, as a MSGA, an SDT RACH preamble, an RRC_RESUME_REQUEST message, and any uplink (UL) data to a gNB. At 222, the gNB sends, as a MSGB, an RRC_RELEASE with a suspend indication and any downlink (DL) data to the UE.

In the CG-based SDT 230, the UE is in PRC_CONNECTED state. At 231, the gNB sends a CONFIGURED_GRANT_CONFIGURATION for SDT to the UE. The UE then goes to a PRC_INACTIVE state. At 232, the UE sends a CONFIGURED_GRANT_PUSCH transmission including an RRC_RESUME_REQUEST and any UL data to the gNB. At 233, the UE sends an RRC_RESUME with a suspend indication and any DL data to the gNB.

Figure 3:
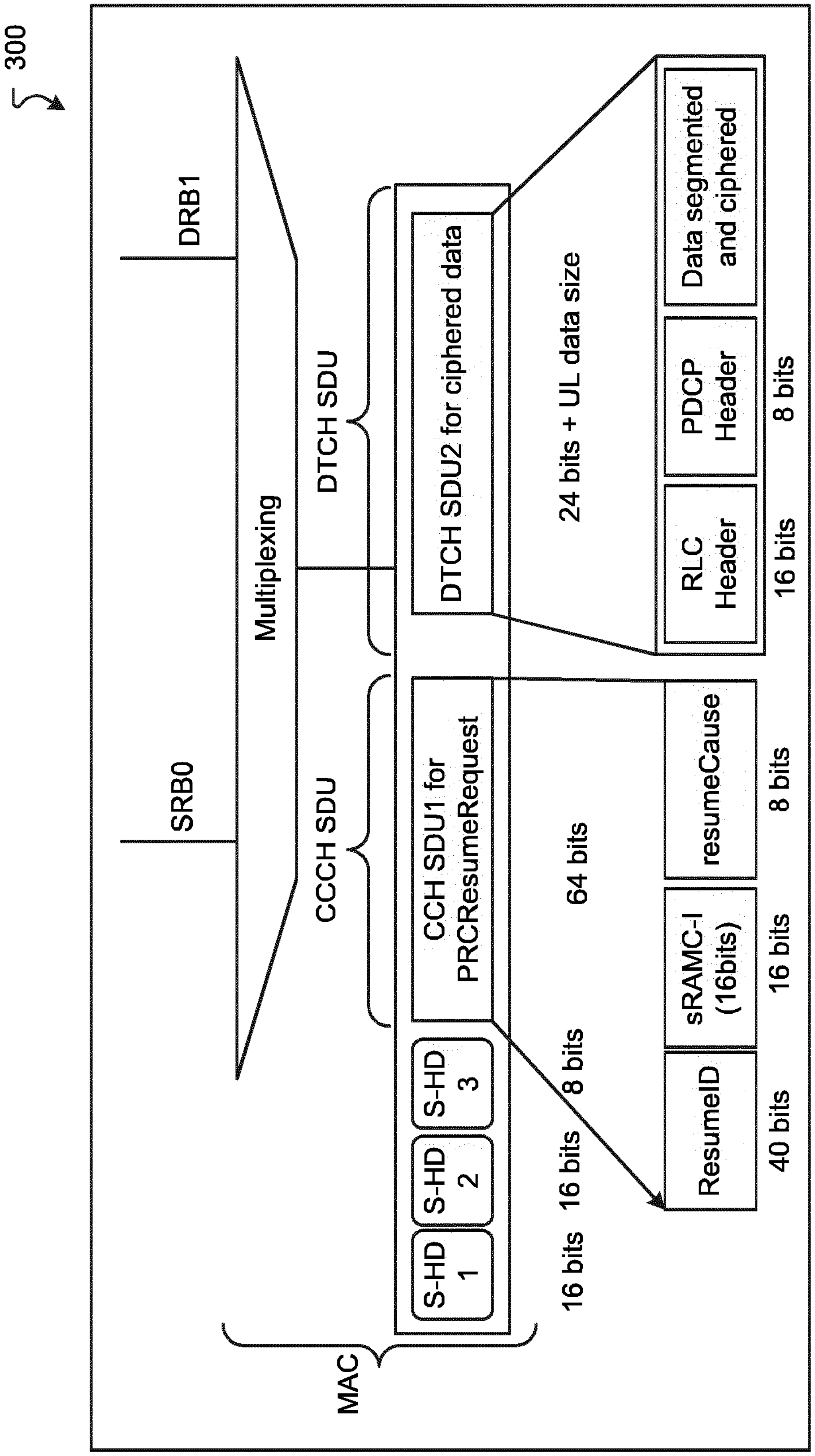
FIG. 3 is a diagram illustrating content of the UL MAC PDU for SDT Msg3/MsgA or CG-based SDT transmission for the baseline RRC-based method, according to an example implementation.
Figure 4:
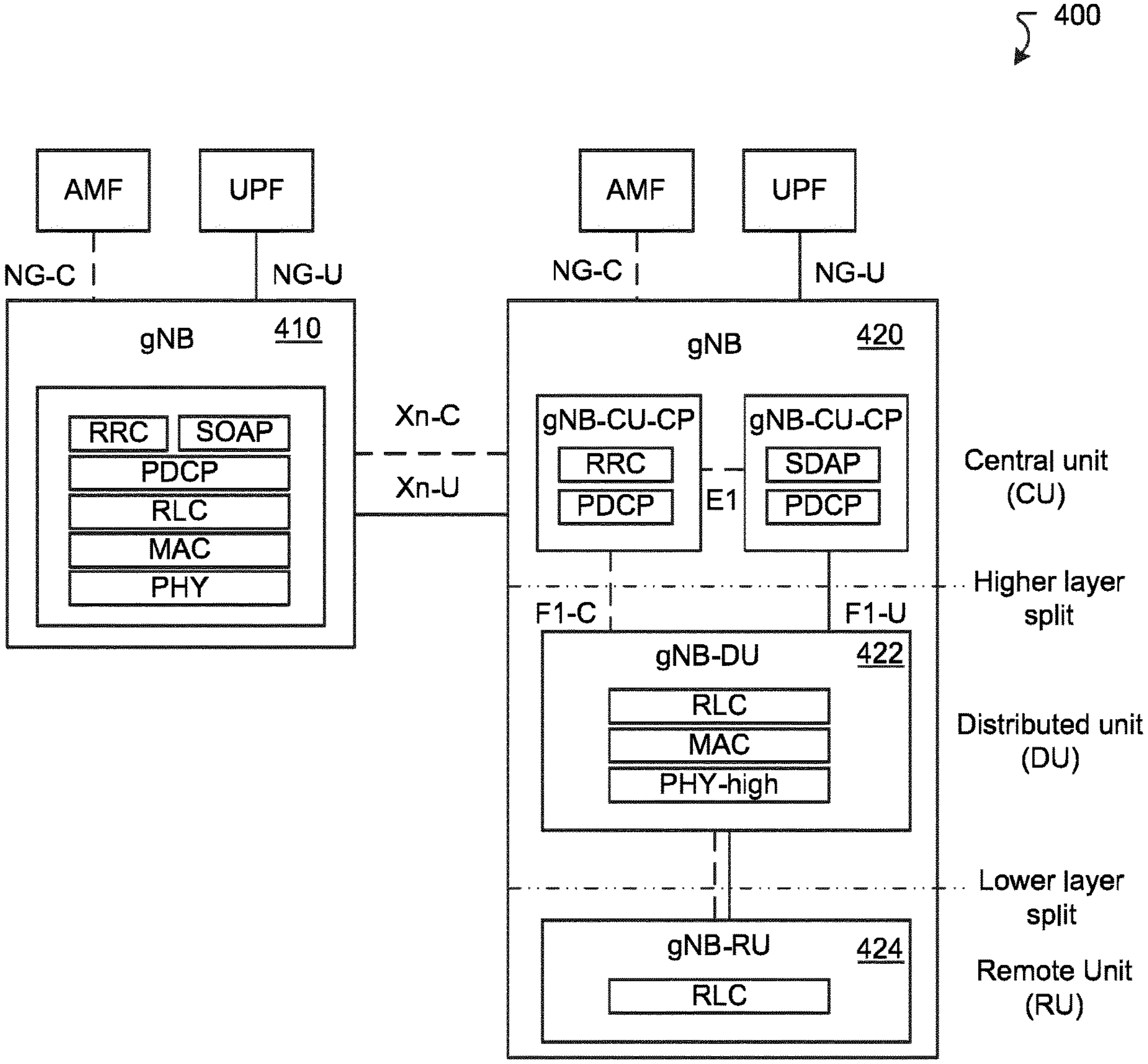
FIG. 4 is a diagram illustrating 5G-RAN distributed (left) and split CU-DU architecture (right) for both user plane (UP) and control plane (CP), according to an example implementation.

The RRC-based approach entails that the UE sends an RRC message including information about e.g. the UE identity and its authentication token (i.e. MAC-I). It is assumed that the RRC Resume Request message is used for this purpose, however in some implementations a different message may be adopted as well; FIG. 3 shows the corresponding uplink media access channel protocol data unit (UL MAC PDU) 300. The SDT procedure is then closed with the reception by the UE of another RRC message. An RRC-less approach instead assumes that the RRC layer need not be involved and the necessary information, such as UE authentication token, can be provided by the UE in the MAC header or as a MAC CE A RAN architecture may be split into centralized baseband units and distributed radio units. The NG-RAN architectures defined in NR are shown in FIG. 4. FIG. 4 is a diagram illustrating 5G-RAN distributed (left) and split CU-DU architecture (right) 400 for both user plane (UP) and control plane (CP). In FIG. 4, on the left, the distributed architecture shows a traditional gNB 410 comprising all RAN protocol layers. On the right, the NG-RAN split architecture 420 is shown with a higher layer separation into a Central Unit (CU) controlling one or more of Distributed Units (DU) 422 and, in some cases, a remote unit (RU) 424 on the network side. Such split architecture, where a function split is applied at one or more protocol layers at the network side, has potential for reduced cost, improved scalability, and more efficient scheduling coordination.

It is noted that a UP packet is the UL payload. IN contrast, a CP packet is a lower layer packet such as a MAC CE.

In the CU/DU split architecture, the following assumptions can be made for the gNB and cell that moves the UE to RRC Inactive state:

UE and CU-CP store the UE Context when UE moves into RRC_INACTIVE.

DU releases the stored UE context when UE moves into RRC_INACTIVE, and the corresponding F1-U tunnels established between DU and CU-UP.

CU-UP may retain the UE context in a suspended state when UE is in RRC_INACTIVE.

Multi-shot SDT entails that multiple UL/DL transmissions can be sent subsequently to a first UL SDT transmission without transitioning the UE to RRC_CONNECTED, i.e. as part of the same SDT procedure.

Figure 5:
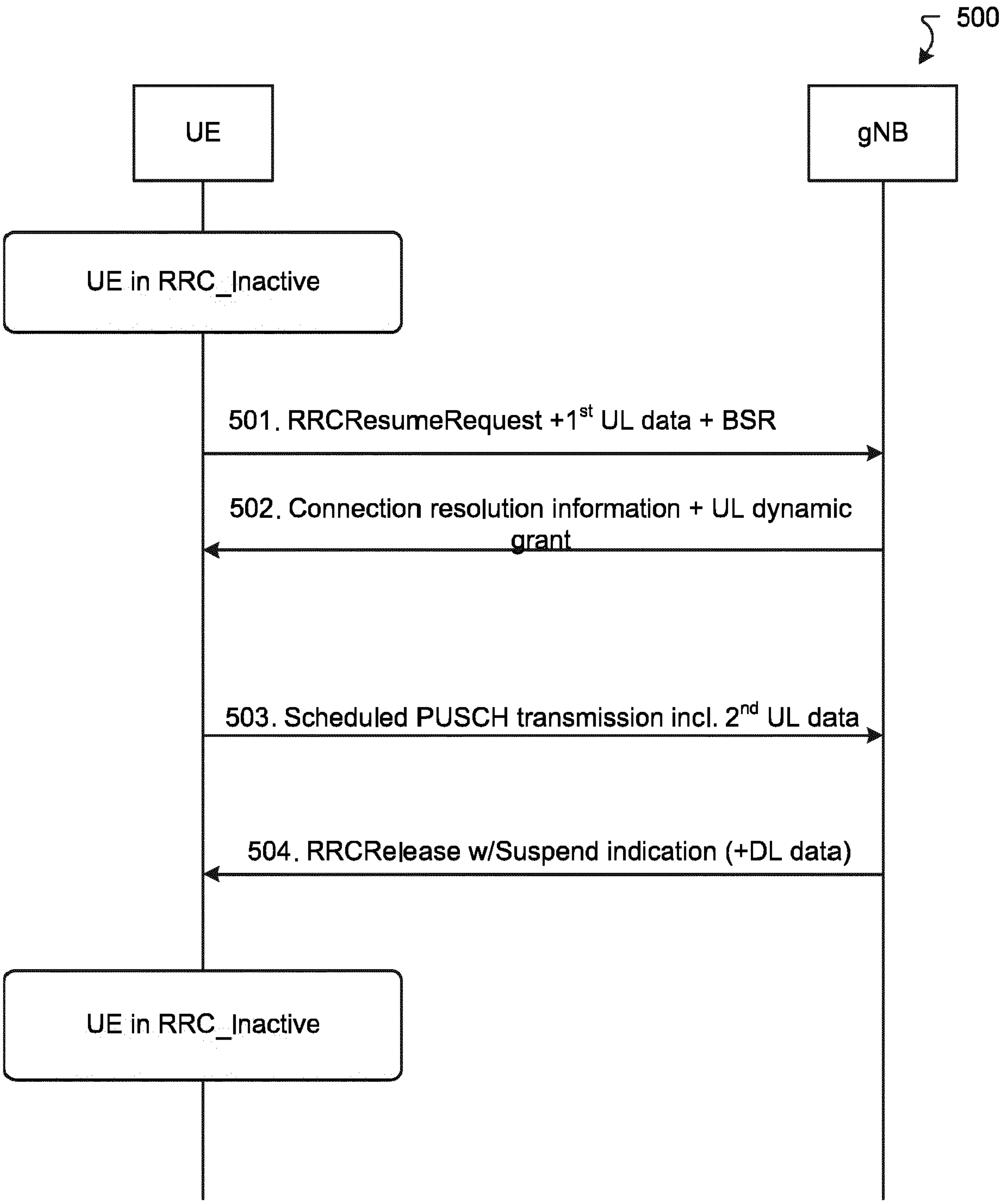
FIG. 5 is a diagram illustrating a multi-shot SDT procedure including the transmission of two UL data according to an example implementation.

In order to allow the UE to use multi-shot SDT, the network should be able to determine that more data is present at the UE buffer for transmission (e.g. based on BSR) and the UE should be able to be assigned dynamic grants or configured grants for transmitting the subsequent UL data as shown in FIG. 5.

FIG. 5 is a diagram illustrating a multi-shot SDT procedure 500 including the transmission of two UL data. At 501, the UE sends an RRC_RESUME_REQUEST message, first UL data, and a buffer status report (BSR) to a gNB. At 502, the gNB sends connection resolution information and an UL dynamic grant to the UE. At 503, the UE sends a scheduled PUSCH transmission, which includes second UL data, to the gNB. At 504, the gNB sends an RRC_RELEASE message with a suspend indication and any DL data to the UE.

Nevertheless, even when using RRC-based SDT, only the first UL SDT transmission in the multi-shot SDT procedure will contain an RRC message (e.g. RRC_RESUME_REQUEST) to allow the UE verification based on the MAC-I information, whereas the subsequent UL SDT transmissions may not contain an RRC message. On one side, there is no need to repeat the UE verification multiple times during the SDT procedure; on the other side, the identification of the UE in subsequent transmissions can be based on dedicated resources assignments in the scheduling grants.

The lack of an RRC message in subsequent UL SDT transmissions means, however, that the gNB CU-CP is unaware of whether there are subsequent SDT transmissions and when SDT should be ended. Accordingly, it is unclear when and how the gNB-CU-CP should be able to close an ongoing SDT procedure, i.e. what should be the trigger for the gNB-CU-CP to send the RRC_RELEASE message (or alike) to the UE.

There is also ambiguity in the gNB-DU about the handling of such subsequent SDT data packets. The control plane procedures executed to establish the UE context information necessary for data transfer is too expensive to be repeated with each UL SDT transmission.

Furthermore, in case of inter-gNB SDT in which the network operates without anchor relocation, the relevant gNB-CU-CP resides at the anchor gNB. In this case, a conventional approach to performing SDT transmission is given by the periodic RAN Notification Area (RNA) update procedure without anchor relocation shown in FIG. 6.

Figure 6:
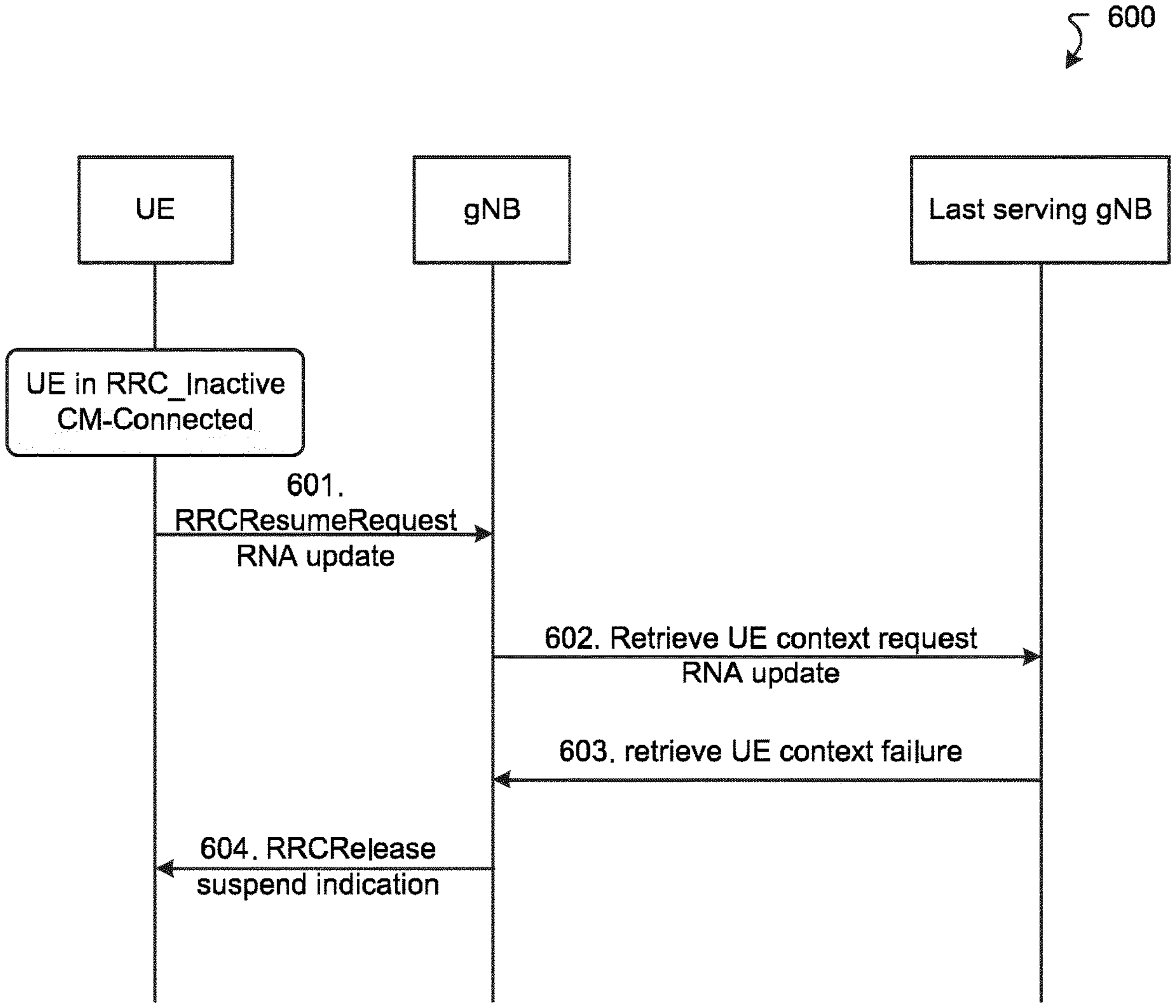
FIG. 6 is a diagram illustrating a RAN Notification Area (RNA) Update procedure without anchor relocation.

FIG. 6 is a diagram illustrating a RAN Notification Area (RNA) Update procedure 600 without anchor relocation. In FIG. 6, the UE is in RRC_INACTIVE CM_CONNECTED state. At 601, the UE sends an RRC_RESUME_REQUEST and RNA update to the gNB. At 602, the gNB sends a RETRIEVE_UE message and the RNA update to a last-serving (anchor) gNB. At 603, the last-serving gNB sends a RETRIEVE_UE_CONTEXT_FAILURE message to the gNB. At 603, the gNB sends an RRC_RELEASE message and a suspend indication to the UE. The RRC Release message is provided immediately by the Last Serving gNB to the gNB (as part of step 603 in FIG. 6) for the transmission to the UE.

In contrast to the above-described conventional UL SDT transmissions in which it is unclear how to terminate, improved techniques of performing multi-shot SDT transactions include determining, by a distributed unit (DU) of a base station (gNB) in a wireless network, a condition for terminating of a multi-shot small data transmission (SDT) and provide an indication of the termination to an entity within the wireless network. For example, when a UE begins a multi-shot SDT transaction, the UE sends an initial UL SDT data packet to a target gNB-DU. When the UE notifies a relevant network entity, e.g., the target gNB-CU-CP, to acquire a UE context, the gNB-DU receives instructions to establish a path for forwarding UL and DL data. As the gNB-DU continues to receive UL SDT data packets from the UE, the DU makes a determination whether a UL SDT data packet is a terminal UL SDT data packet, i.e., the final data packet of the transaction. Once the gNB-DU makes that determination, the gNB-DU generates termination data indicating a termination of the multi-shot SDT transaction and transmits the termination data along the path established per the received instructions from the relevant network entity.

The above-described improved techniques allow the base station central unit control plane (gNB-CU-CP) to send a termination message to the UE. This may save significant power resources in the wireless network and in the UE by minimizing the duration of PDCCH monitoring.

In some implementations, data representing the path is used for sending subsequent UL SDT packets over the indicated path.

A network centric method, to be deployed at target gNB-DU, provides that the target gNB-DU determine when an ongoing multi-shot SDT transaction of a given UE should be ended and signal an "End of SDT transaction indication" to the relevant network entities in a RAN split architecture (namely towards gNB-CU-CP) of either anchor or target nodes according to two possible scenarios:

"scenario #1": SDT without anchor relocation

"scenario #2: SDT with anchor relocation.

In turn, this allows the anchor or target gNB-CU-CP to timely trigger the generation of the RRC_RELEASE message with Suspend Information. This also allows for the target gNB-DU to forward this RRC_RELEASE message for transmission to the UE to signal the end of the SDT transaction and to move back the UE to RRC_INACTIVE.

The SDT termination determination is done at the network side in the DU (i.e. network centric approach) either based on local information in the DU or based on information provided by the UE. When based on information provided by the UE there are two variants: either with signalling impact to UE (e.g. UE includes end of SDT transaction in MAC CE) or without any signalling impact to the UE, e.g. leveraging existing MAC/RLC signalling such as BSR (example: with a special pre-defined value).

The above-described network-centric method has multiple options depending on whether anchor relocation is not used (Scenario #1) or is used (Scenario #2) as stated above. The network-centric method also depends on a forwarding solution for a UL SDT transaction termination indication:

"Alternative A": UL SDT transaction termination indication forwarded via CP interfaces, "Alternative B": UL SDT transaction termination indication forwarded via UP tunnels, where the selection is made by target gNB-CU-CP. The target gNB-CU-CP then informs the target DU about the selected alternative.

The steps included in the above-described network-centric method are described in the following, accounting for both scenarios without and with anchor relocation (Scenario 1 and 2) and both data forwarding solutions (Alternative A and B).

Step 1: Upon or after the reception of the first UL SDT transmission from the UE, target gNB-DU receives information from target gNB-CU-CP about the chosen forwarding solution for the SDT.

This information could be provided to the target gNB-DU from the target gNB-CU-CP in response to the initial UL RRC message (F1: UE context setup procedure) sent by the DU (at the $1^{st}$ UL SDT packet).

Scenario 1 (inter-gNB SDT without anchor relocation): target gNB-DU receives information from the target gNB-CU-CP that the chosen forwarding solution is data forwarding to anchor gNB-CU-CP, i.e. without anchor relocation.

Scenario 2 (inter-gNB SDT with anchor relocation or intra-gNB SDT): target gNB-DU receives information from the target gNB-CU-CP that the chosen forwarding solution is data forwarding to target gNB-CU-CP, i.e. with anchor relocation.

Step 2: While the SDT procedure is then ongoing for the UE, target gNB-DU evaluates/determines whether the UL SDT transaction should be terminated.

The evaluation/determination can be done based on legacy information received from the UE about data in buffer (BSR/SR) and/or local monitoring and information (e.g. monitoring of the number of UL SDT transmissions already performed by the UE in the ongoing SDT transaction, data inactivity monitoring, load level). In this case there is no UE impact.

The determination can also be done via explicit new signalling from the UE such as e.g. a new End of SDT indication encoded in MAC CE.

The determination can be done continuously, periodically or event-based (e.g. upon the reception of a UL SDT).

Step 3: If the target gNB-DU determines that the UL SDT transaction should be ended, the target gNB-DU signals termination indication to the relevant network entities (namely either gNB-CU-CP or gNB-CU-UP) depending if Alternative A or B is chosen for this step (applies for both Scenarios 1 and 2). It is noted that, after receiving the initial UL SDT packet of the transaction, data is generated by the anchor gNB-CU-UP representing a path by which the termination data is transmitted within the wireless network and is sent to the gNB-DU Alternative A (UL SDT transaction termination via CP interfaces, F1-C/Xn-C)

Step 3.1: target gNB-DU indicates to target gNB-CU-CP over F1-C information related to the SDT procedure termination, using e.g. a UL SDT transaction termination indication.

The above F1-C UL SDT transaction termination indication is included in an F1-C message which may also include the last UL SDT packet or not, depending on the forwarding path chosen.

Scenario 1 (inter-gNB SDT without anchor relocation):

Step 3.2: As the anchor gNB may be in control of the UL SDT transaction termination, thus target gNB-CU-CP informs anchor gNB-CU-CP about the information related to the UL SDT transaction termination.

This can be done by using an existing XnAP message (e.g. XnAP Release or XnAP Context Retrieve Request) or a new XnAP message.

Step 3.3: The anchor gNB-CU-CP, upon receiving the information related to UL SDT transaction termination, builds an RRC_RELEASE message with Suspend Information towards the UE, which it delivers via the target CU CP over Xn.

The UL SDT transaction termination could be delayed in case DL data is expected.

Scenario 2 (inter-gNB SDT with anchor relocation or intra-gNB SDT):

Step 3.2: target gNB-CU-CP is in control of the UL SDT transaction termination, thus upon receiving the information related to UL SDT transaction termination, builds an RRC release message with Suspend Information towards the UE, which it delivers via target gNB-DU.

The UL SDT transaction termination could be delayed in case DL data is expected.

Alternative B (UL SDT transaction termination via UP interface, F1-U)

Scenario 1 (inter-gNB SDT without anchor relocation):

Step 3.1: target gNB-DU indicates to anchor gNB-CU-UP over F1-U, using e.g. a UL SDT transaction termination indication Step 3.2: Upon receiving the information about UL SDT transaction termination, anchor CU-UP informs the anchor CU-CP over E1.

Step 3.3: Upon receiving the information about UL SDT transaction termination, anchor CU-CP builds an RRC_RELEASE message with Suspend Information towards the UE, which it delivers to the UE via Target CU-CP over Xn via an existing XnAP message or new XnAP message.

The UL SDT transaction termination could be delayed in case DL data is expected.

Scenario 2 (inter-gNB SDT with anchor relocation or intra-gNB SDT) (In this scenario, the UE Context is relocated to or already present in the target gNB and hence the final RRC_RELEASE with suspend indication is also generated by the target gNB-CU-CP):

Step 3.1: Target gNB-DU indicates to Target gNB-CU-UP over F1-U using e.g. a UL SDT transaction termination indication.

Step 3.2: Upon receiving the information about UL SDT transaction termination, target CU-UP informs target CU-CP over E1.

Step 3.3: Upon receiving the information about UL SDT transaction termination, target CU-CP builds an RRC_RELEASE message with Suspend Information towards the UE, which it delivers to the UE via target gNB-DU.

The UL SDT transaction termination could be delayed in case DL data is expected.

In all cases, the target gNB-DU is proposed to store a temporary UE Context based on I-RNTI received from the UE/gNB-CU-CP during the UL SDT transaction. This may exist until the completion of the UL SDT transaction and may be discarded only after sending of RRC_RELEASE message to the UE. Furthermore, resource release is also performed at the corresponding logical entities after UL SDT transaction termination, for example, gNB-DU and gNB-CU-UP.

Figure 7:
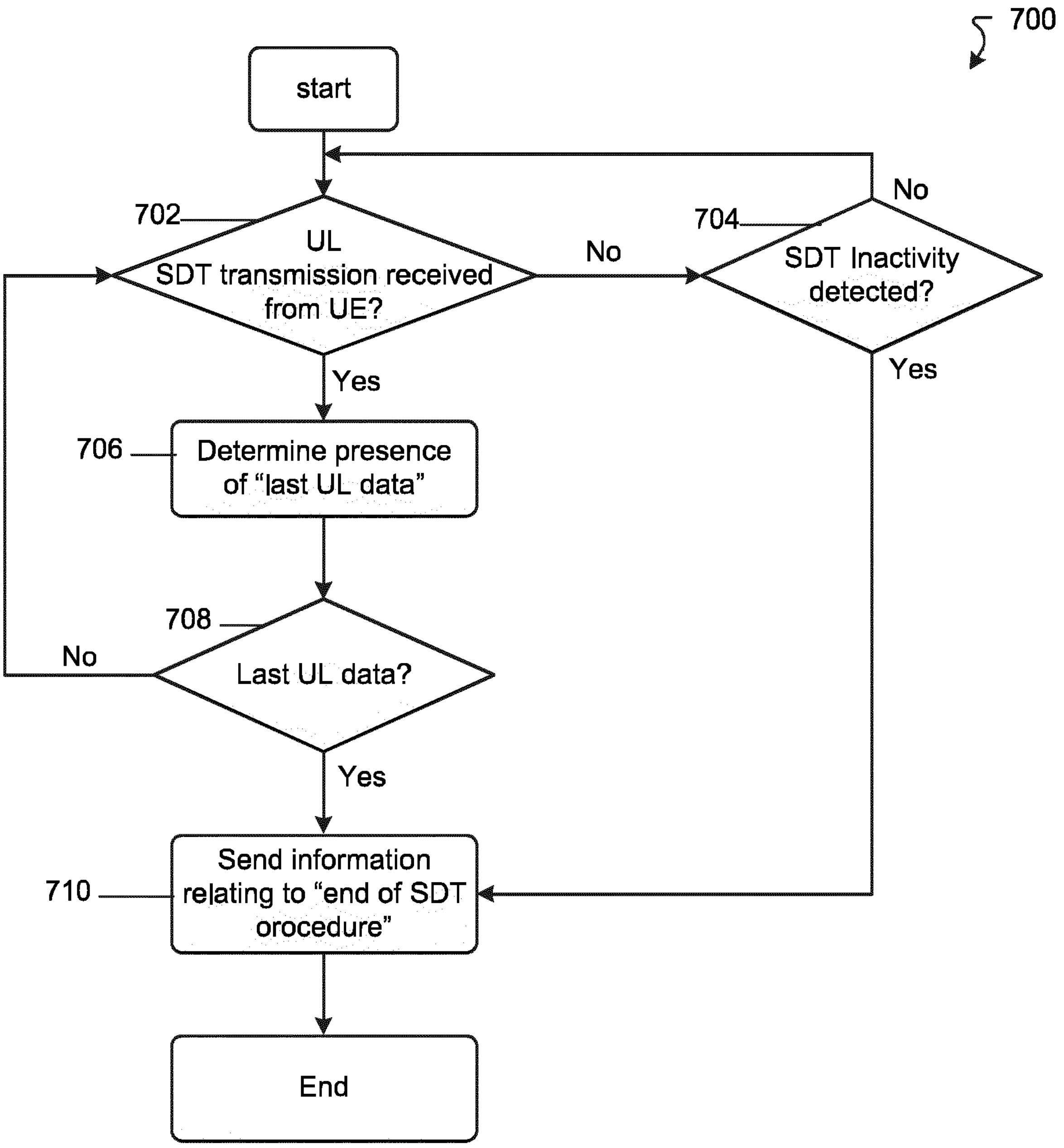
FIG. 7 is a flow chart illustrating a receiving gNB-DU determination of last UL data according to an example implementation.

FIG. 7 is a flow chart illustrating a receiving gNB-DU UL SDT transaction termination 700.

At 702, it is determined whether the gNB-DU UL received a UL SDT data packet.

If a UL SDT data packet has not been received at the gNB-DU, then at 704 the gNB-DU detects whether there is any inactivity in the UL SDT transaction. If not, then the gNB-DU continues to determine whether it has received a UL SDT data packet. If so, then the gNB-DU determines that the UL SDT transaction has terminated.

If a UL SDT data packet has been received at the gNB-DU, then at 706 the gNB-DU determines whether there is an indication of the UL SDT data packet being the terminal UL SDT data packet.

At 708, if the gNB-DU determines there is no indication of the UL SDT data packet being the terminal UL SDT data packet, then the gNB-DU waits for another UL SDT data packet.

If the gNB-DU determines there is an indication of the UL SDT data packet being the terminal UL SDT data packet, then at 710 the gNB-DU sends a UL SDT transaction termination indication to a relevant entity within the network.

FIGS. 8-11 illustrate UL SDT transaction termination processes for both Scenarios 1 and 2 and Alternatives A and B. Note that in Scenario 1, in which UE initiates SDT to a gNB different than the anchor gNB and no anchor relocation is performed, both the first and subsequent (UL) data is to be processed at the anchor gNB-CU-UP and it can be forwarded from the target gNB-DU to anchor gNB-CU-UP directly.

Figure 8:
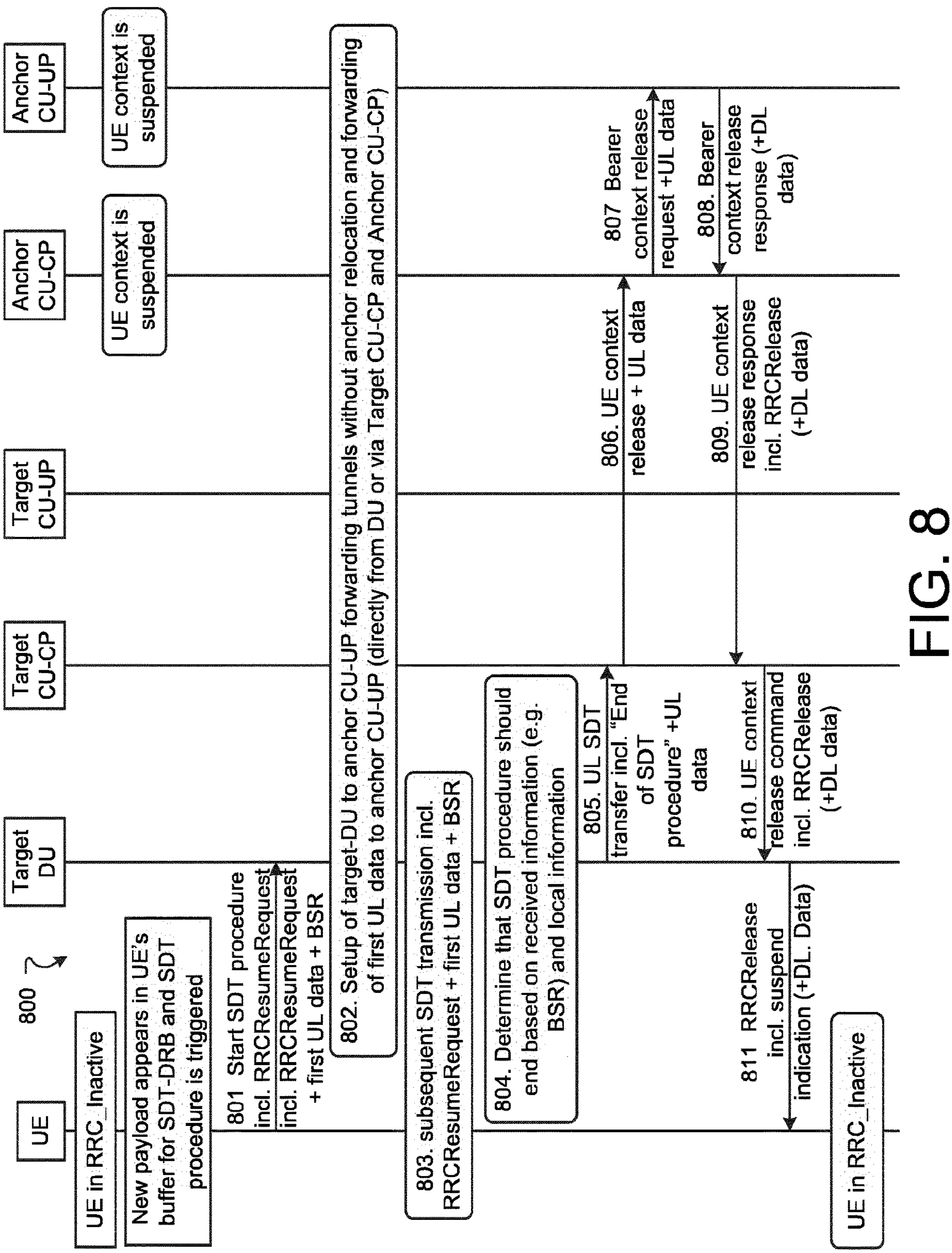
FIG. 8 is a sequence diagram illustrating a gNB-DU determination of last UL data using inter-gNB SDT without anchor relocation and a notification path including the target gNB-CU-CP according an example implementation.

FIG. 8 is a sequence diagram illustrating a gNB-DU determination 800 of UL SDT transaction termination using Scenario 1, Alternative A, i.e., inter-gNB SDT without anchor relocation and a notification path via CP interfaces toward the anchor gNB-CU-CP.

- At 801 and 802, the target gNB-DU receives a first SDT data packet from the UE, communicates with the target gNB-CU-CP via F1-C in order to acquire the UE context (e.g. UL TEID address) and establishes the DL+UL forwarding F1-U tunnels for the UE's SDT DRB towards the anchor gNB-CU-UP.
  - Note: DU establishes a UE context using the received I-RNTI as key and retains the UE context until the end of SDT procedure.
- At 803, the UE may perform one or more subsequent UL SDT data packet transmissions to the target gNB-DU as part of the same SDT procedure (or transaction), i.e. without a switch to RRC_CONNECTED. Either the first SDT data packet has already indicated the presence of additional data in the buffer via e.g. a BSR or the UE indicates presence of further data after the first SDT transmission.
- At 804, for each SDT data packet, the target gNB-DU determines whether the current UL SDT data packet is the last in the ongoing UL SDT transaction for the UE or not, based on the information provided by the UE or using local information.
  - When this evaluation is based on information provided by the UE, there are two variants depending if UE signalling is impacted or not:
    - Variant 1: no UE signaling impact, i.e. target gNB-DU determines the end of UL SDT transaction based on legacy information from UE.
      - The UE may provide the BSR to the network.
      - In some implementations, the BSR index indicating a pre-defined value (e.g: 0 bytes) can convey the indication of a UE preference to close the ongoing SDT procedure.
      - In some implementations, if UE does not include a BSR while there is room for it, can convey the indication of a UE preference to close the ongoing SDT procedure.
      - In some implementations, a transmission of the indication of the UE preference is performed via lower protocol layers.
    - Variant 2: with UE signaling impact, gNB-DU determines the end of UL SDT transaction based on new signalling information from UE.
      - In some implementations, if the UE determines the current UL SDT data packet to be the terminal UL SDT data packet in the buffer and no further data is expected to arrive in the buffer soon, the UE sends information to the target gNB-DU in the SDT transmission via e.g. a MAC CE or RLC message indicating a UL SDT transaction termination.
- At 805, the target gNB-DU sends a UL SDT transaction termination indication to the target gNB-CU-CP via F1-C.
  - In some implementations, the indication is an "F1: UL SDT Transfer" with an IE indicating "termination of UL SDT" or the like.
  - In some implementations, the target gNB-DU send a UE INACTIVITY NOTIFICATION message to the target gNB-CU-CP including an IE with "termination of UL SDT".
- At 806, in response to receiving the UL SDT transaction termination indication, the target gNB-CU-CP informs the anchor gNB-CU-CP to send RRC_RELEASE to conclude the UL SDT procedure.
  - The XnAP_UE_RELEASE message or XnAP_CONTEXT_RETRIEVE_REQUEST message can be reused or extended for this purpose. In some implementations, a new XnAP message can be used.
  - The target gNB CU-CP stores UE context (i.e. I-RNTI of UE) during the SDT procedure without anchor relocation performed.
- At 807 and 808, the anchor gNB-CU-CP can release the anchor gNB-CU-UP and DL tunnels to the target gNB-DU after delivery of any remaining DL data.
- At 809, the anchor gNB-CU-CP generates the RRC_RELEASE that terminates the SDT transaction and piggybacks it in a new or existing XnAP message (e.g. XnAP release message) to target gNB-CU-CP.
- At 810, the target gNB-CU-CP can release target gNB-DU with piggybacking the RRC_RELEASE towards the UE.
  - In some implementations, different messages are used for these purposes.
  - In some implementations, gNB-DU and gNB-CU-CP discard the UE context at this point.

At 811, the RRC_RELEASE message is sent to the UE, where the RRC message indicates (requests) the closing of the SDT procedure.

Figure 9:
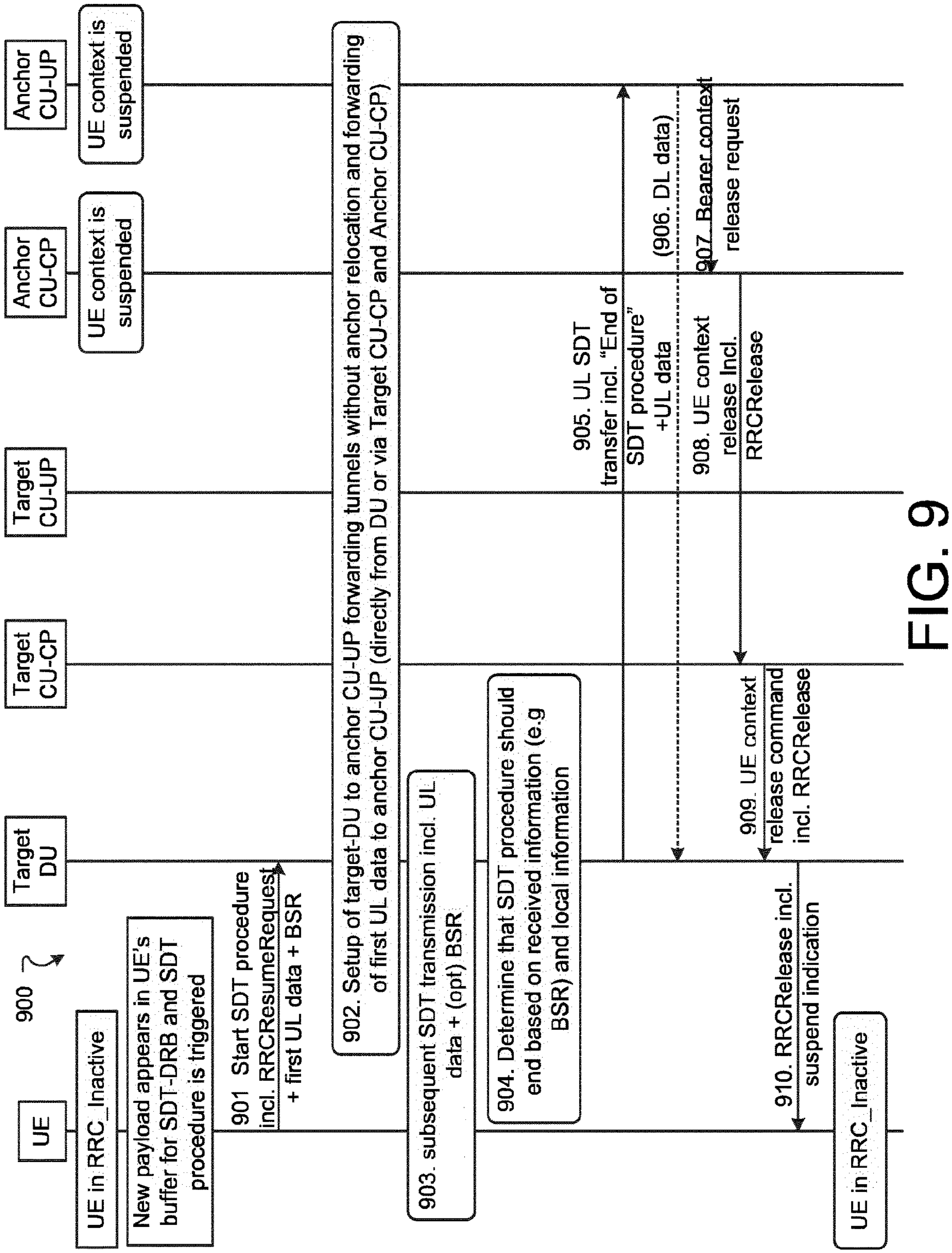
FIG. 9 is a sequence diagram illustrating a gNB-DU determination of last UL data using inter-gNB SDT without anchor relocation and a notification path including the anchor gNB-CU-UP according to an example implementation.

FIG. 9 is a sequence diagram illustrating a gNB-DU determination 900 of UL SDT transaction termination using Scenario 1, Alternative B, i.e., inter-gNB SDT without anchor relocation and a notification path via UP tunnel including the anchor gNB-CU-UP towards the anchor gNB-CU-CP.

At 901 and 902, the target gNB-DU receives a first SDT data packet from the UE, communicates with the target gNB-CU-CP via F1-C in order to acquire the UE context (e.g. UL TEID address) and establishes the DL+UL forwarding F1-U tunnels for the UE's SDT DRB towards the anchor gNB-CU-UP.

Note: DU establishes a UE context using the received I-RNTI and retains the UE context until the end of SDT procedure.

At 903, the UE may perform one or more subsequent UL SDT data packet transmissions to the target gNB-DU as part of the same SDT procedure, i.e. without a switch to RRC_CONNECTED. Either the first SDT data packet has already indicated the presence of additional data in the buffer via e.g. a BSR or the UE indicates presence of further data after the first SDT transmission.

At 904, for each SDT data packet, the target gNB-DU determines whether the current UL SDT data packet is the last in the ongoing UL SDT transaction for the UE or not, based on the information provided by the UE or using local information.

When this evaluation is based on information provided by the UE, there are two variants depending if UE signaling is impacted or not:

Variant 1: no UE signaling impact, i.e. target gNB-DU determines the end of UL SDT transaction based on legacy information from UE.

The UE may provide the BSR to the network.

In some implementations, the BSR index indicating a pre-defined value (e.g. 0 bytes) can convey the indication of a UE preference to close the ongoing SDT procedure.

In some implementations, if UE does not include a BSR while there is room for it, can convey the indication of a UE preference to close the ongoing SDT procedure.

Variant 2: with UE signaling impact, gNB-DU determines the end of UL SDT transaction based on new signalling information from UE.

In some implementations, if the UE determines the current UL SDT data packet to be the terminal UL SDT data packet in the buffer and no further data is expected to arrive in the buffer soon, the UE sends information to the target gNB-DU in the SDT transmission via e.g. a MAC CE or RLC message indicating a UL SDT transaction termination.

At 905, the target gNB-DU indicates a terminal UL SDT data packet indication when transferring UL data to anchor gNB-CU-UP over the user plane (UP) Frame protocol PDU (e.g. TS 38.425).

At 906 and 907, the anchor gNB-CU-UP receives the terminal UL SDT data packet indication and informs anchor gNB-CU-CP about the termination of the UL SDT transaction after sending any pending DL data to the target gNB-DU; its own resources are also released afterward.

At 908, the anchor gNB-CU-CP transmits a new message to the target gNB-CU-CP that embeds an RRC_RELEASE message to be sent to the UE.

At 909 and 910, the target gNB-CU-CP forwards the received RRC_RELEASE to the UE via the target gNB-DU.

Figure 10:
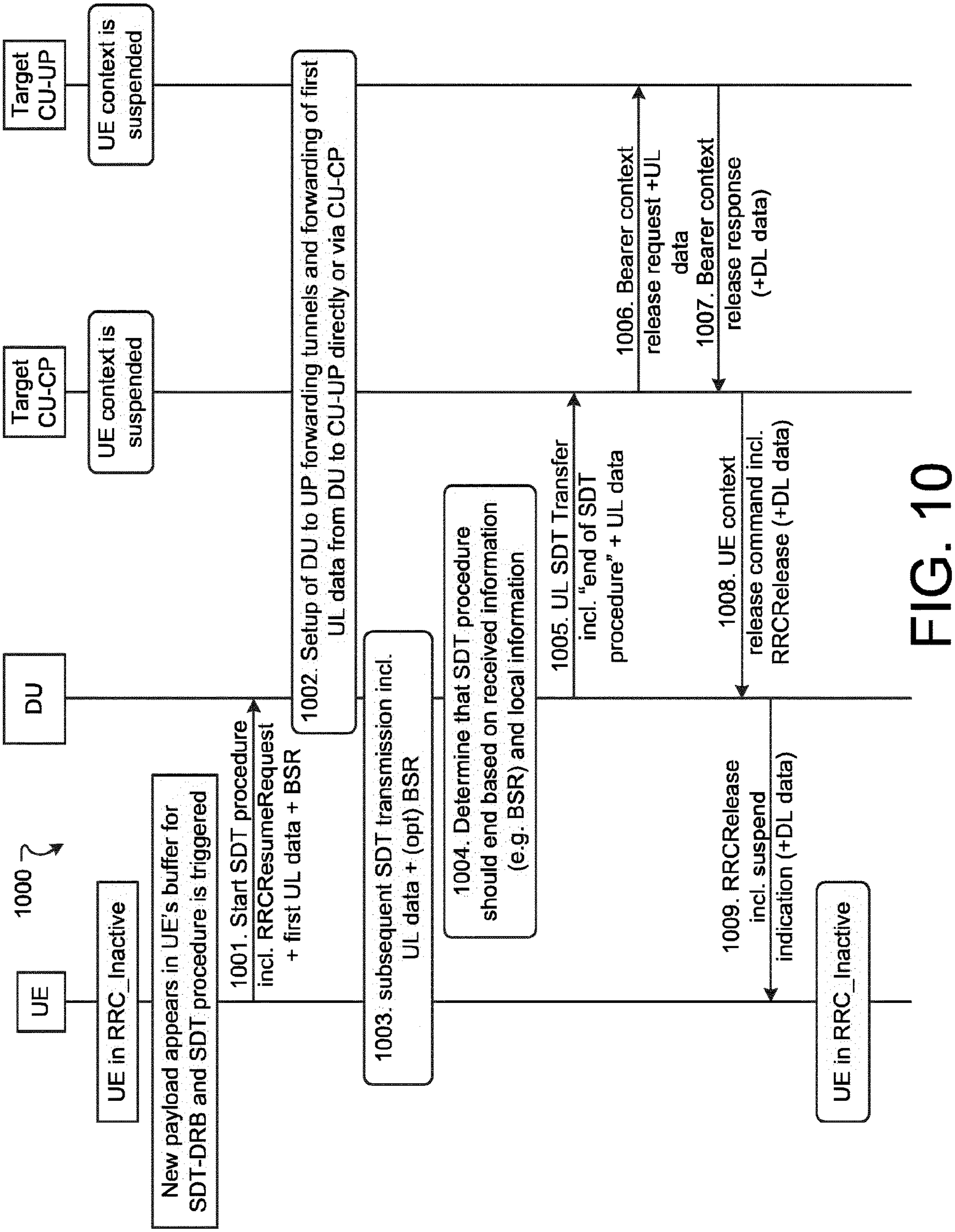
FIG. 10 is a sequence diagram illustrating a gNB-DU determination of last UL data using inter-gNB SDT with anchor relocation and a notification path direct to the target gNB-CU-CP according to an example implementation.

FIG. 10 is a sequence diagram illustrating a gNB-DU determination 1000 of terminal UL data using inter-gNB SDT with anchor relocation and a notification path via CP interfaces to the target gNB-CU-CP.

At 1001 and 1002, the target gNB-DU receives a first SDT data packet from the UE, communicates with the target gNB-CU-CP via F1-C in order to acquire the UE context (e.g. UL TEID address) and establishes the DL+UL forwarding F1-U tunnels for the UE's SDT DRB towards the target gNB-CU-UP.

At 1003, the UE may perform one or more subsequent UL SDT data packet transmissions to the target gNB-DU as part of the same SDT procedure, i.e. without a switch to RRC_CONNECTED. Either the first SDT data packet has already indicated the presence of additional data in the buffer via e.g. a BSR or the UE indicates presence of further data after the first SDT transmission.

At 1004, for each SDT data packet, the target gNB-DU determines whether the current UL SDT data packet is the last in the ongoing UL SDT transaction for the UE or not, based on the information provided by the UE or using local information.

When this evaluation is based on information provided by the UE, there are two variants depending if UE signalling is impacted or not:

Variant 1: no UE signaling impact, i.e. target gNB-DU determines the end of UL SDT transaction based on legacy information from UE.

The UE may provide the BSR to the network.

In some implementations, the BSR index indicating a pre-defined value (e.g.: 0 bytes) can convey the indication of a UE preference to close the ongoing SDT procedure.

In some implementations, if UE does not include a BSR while there is room for it, can convey the indication of a UE preference to close the ongoing SDT procedure.

Variant 2: with UE signaling impact, gNB-DU determines the end of UL SDT transaction based on new signalling information from UE.

In some implementations, if the UE determines the current UL SDT data packet to be the terminal UL SDT data packet in the buffer and no further data is expected to arrive in the buffer soon, the UE sends information to the target gNB-DU in the SDT transmission via e.g. a MAC CE or RLC message indicating a UL SDT transaction termination.

At 1005, the target gNB-DU sends a UL SDT transaction termination indication to the target gNB-CU-CP via F1-C.

In some implementations, the indication is an "F1: UL SDT Transfer" with an IE indicating "termination of UL SDT" or the like.

In some implementations, the target gNB-DU send a UE INACTIVITY NOTIFICATION message to the target gNB-CU-CP including an IE with "termination of UL SDT."

At 1006 and 1007, the target gNB-CU-CP can release the target gNB-CU-UP and DL tunnels to the target gNB-DU after delivery of any remaining DL data by the target gNB-CU-UP.

At 1008, the target gNB-CU-CP can release target gNB-DU with piggybacking the RRC_RELEASE towards the UE.

In some implementations, different messages are used for these purposes.

In some implementations, gNB-DU and gNB-CU-CP discard the UE context at this point.

At 1009, the RRC_RELEASE message is sent to the UE, where the RRC message indicates (requests) the closing of the SDT procedure.

Figure 11:
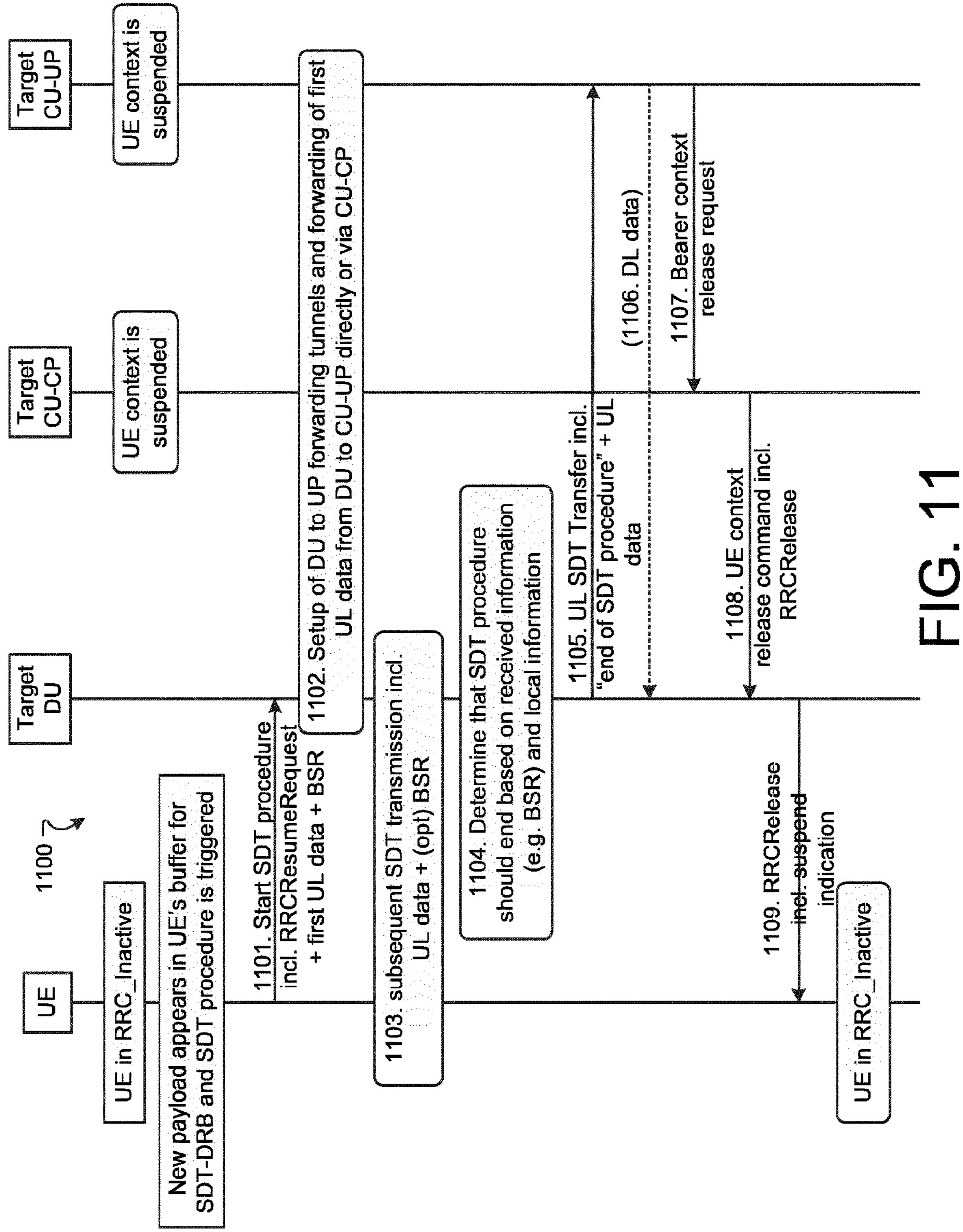
FIG. 11 is a sequence diagram illustrating a gNB-DU determination of last UL data using inter-gNB SDT with target relocation and a notification path including the target gNB-CU-UP.

FIG. 11 is a sequence diagram illustrating a gNB-DU determination of last UL data using inter-gNB SDT with anchor relocation and a notification path via UP tunnel to the target gNB-CU-UP towards the target gNB-CU-CP.

At 1101 and 1102, the target gNB-DU receives a first SDT data packet from the UE, communicates with the target gNB-CU-CP via F1-C in order to acquire the UE context (e.g. UL TEID address) and establishes the DL+UL forwarding F1-U tunnels for the UE's SDT DRB towards the target gNB-CU-UP.

At 1103, the UE may perform one or more subsequent UL SDT data packet transmissions to the target gNB-DU as part of the same SDT procedure, i.e. without a switch to RRC_CONNECTED. Either the first SDT data packet has already indicated the presence of additional data in the buffer via e.g. a BSR or the UE indicates presence of further data after the first SDT transmission.

At 1104, for each SDT data packet, the target gNB-DU determines whether the current UL SDT data packet is the last in the ongoing UL SDT transaction for the UE or not, based on the information provided by the UE or using local information.

When this evaluation is based on information provided by the UE, there are two variants depending if UE signalling is impacted or not:

Variant 1: no UE signaling impact, i.e. target gNB-DU determines the end of UL SDT transaction based on legacy information from UE.

The UE may provide the BSR to the network.

In some implementations, the BSR index indicating a pre-defined value (e.g.: 0 bytes) can convey the indication of a UE preference to close the ongoing SDT procedure.

In some implementations, if UE does not include a BSR while there is room for it, can convey the indication of a UE preference to close the ongoing SDT procedure.

Variant 2: with UE signaling impact, gNB-DU determines the end of UL SDT transaction based on new signalling information from UE.

In some implementations, if the UE determines the current UL SDT data packet to be the terminal UL SDT data packet in the buffer and no further data is expected to arrive in the buffer soon, the UE sends information to the target gNB-DU in the SDT transmission via e.g. a MAC CE or RLC message indicating a UL SDT transaction termination.

At 1105, the target gNB-DU indicates a terminal UL SDT data packet indication when transferring UL data to target gNB-CU-UP over the user plane (UP) Frame protocol PDU (e.g. TS 38.425).

At 1106 and 1107, the target gNB-CU-UP receives the terminal UL SDT data packet indication and informs target gNB-CU-CP about the termination of the UL SDT transaction after sending any pending DL data to the target gNB-DU; its own resources are also released afterward.

At 1108 and 1109, the target gNB-CU-CP forwards the received RRC_RELEASE to the UE via the target gNB-DU.

Example 1-1: FIG. 12 is a flow chart illustrating an example method 1200 of performing the improved techniques. Operation 1210 includes receiving, by a distributed unit of a target base station (target gNB-DU) from a user equipment (UE) within a wireless network during a multi-shot SDT transaction, a UL SDT packet. Operation 1220 includes determining whether the UL SDT packet is a terminal UL SDT packet. Operation 1230 includes, in response to the determination that the UL SDT packet is the terminal UL SDT packet, generating termination data indicating a termination of the multi-shot SDT transaction; and transmitting the termination data to a central unit of a base station (gNB-CU) along a path within the wireless network, the termination data indicating a termination of the SDT transaction.

Example 1-2: According to an example implementation of example 1-1, wherein the base station is an anchor (anchor gNB) different from the target gNB, the anchor gNB being a last serving gNB for the UE, and wherein the path within the wireless network terminates at a control plane of the central unit of the anchor base station (anchor gNB-CU-CP).

Example 1-3: According to an example implementation of example 1-2, wherein the path within the wireless network terminates at the anchor gNB-CU-CP via the target gNB-CU-CP.

Example 1-4: According to an example implementation of example 1-3, further comprising after transmitting the termination data, receiving, from the anchor gNB-CU-CP via the target gNB-CU-CP within an XnAP message, radio resource control release (RRC_RELEASE) data indicating that the multi-shot SDT transaction is closed; and transmitting the RRC_RELEASE data to the UE.

Example 1-5: According to an example implementation of any of examples 1-3 and 1-4, wherein the determining whether the UL SDT packet is a terminal UL SDT packet is based on information provided by the UE.

Example 1-6: According to an example implementation of example 1-5, further comprising receive buffer status report (BSR) data from the UE, the BSR data including an index indicating a condition by which a UL SDT packet is determined to be a terminal UL SDT packet.

Example 1-7: According to an example implementation of any of examples 1-4 to 1-6, wherein the determining whether the UL SDT packet is a terminal UL SDT packet is based on a threshold elapse of time since a previous UL SDT data packet was received.

Example 1-8: According to an example implementation of any of examples 1-2 to 1-7, wherein the path within the wireless network terminates at the anchor gNB-CU-CP via the anchor gNB-CU-UP.

Example 1-9: According to an example implementation of examples 1-2 to 1-8, wherein the method further comprises receiving downlink (DL) data from the anchor gNB-CU-UP; receiving, from the anchor gNB-CU-CP, radio resource control release (RRC_RELEASE) data indicating that the multi-shot SDT transaction is closed; and transmitting the RRC_RELEASE data to the UE after transmitting a DL data packet.

Example 1-10: According to an example implementation of any of examples 1-1 to 1-9, wherein the gNB is the target gNB, and wherein the path within the wireless network terminates at a control plane of the central unit of the target base station (target gNB-CU-CP).

Example 1-11: According to an example implementation of any of examples 1-1 to 1-10, wherein the path within the wireless network terminates at the target gNB-CU-CP via the target gNB-CU-UP.

Example 1-12: According to an example implementation of example 1-11, further comprising after determining that a UL SDT data packet is the terminal UL SDT packet, receiving, from the target gNB-CU-CP, radio resource control release (RRC_RELEASE) data indicating that the multi-shot SDT transaction is terminated; and transmitting the RRC_RELEASE data to the UE.

Example 1-13: According to an example implementation of any of examples 1-10 to 1-12, wherein the path within the wireless network terminates at the target gNB-CU-CP directly from the target gNB-DU.

Example 1-14: According to an example implementation of example 1-10, further comprising receiving downlink (DL) data from the target gNB-CU-UP; receiving, from the target gNB-CU-CP, radio resource control release (RRC_RELEASE) data indicating that the multi-shot SDT transaction is terminated; and, after transmitting the received DL data packet, transmitting the RRC_RELEASE data to the UE.

Example 1-15: According to an example implementation of any of examples 1-1 to 1-14, further comprising, after receiving the initial UL SDT data packet, receive, from a control plane of a central unit of the target base station (target gNB-CU-CP), data representing a path by which the termination data is transmitted within the wireless network.

Example 1-16: According to an example implementation of example 1-14, further comprising receiving an inactive radio network temporary identifier (I-RNTI); generating a temporary UE context based on the I-RNTI; and storing the temporary UE context for a duration of the multi-shot SDT transaction.

Example 1-17: According to an example implementation of examples 1-15 and 1-16, further comprising receiving, from the target gNB-CU-CP, radio resource control release (RRC_RELEASE) data indicating that the multi-shot SDT transaction is terminated; transmitting the RRC_RELEASE data to the UE; and after transmitting the RRC_RELEASE data to the UE, discarding the temporary UE context.

Example 1-18: According to an example implementation of any of examples 1-1 to 1-17, wherein the UL SDT packet can be one of an UL SDT user plane packet, an UL SDT control plane packet, or a combination of user plane and control plane packet.

Example 1-19: According to an example implementation of any of examples 1-1 to 1-18, further comprising, in response to the determination that the UL SDT packet is not the terminal UL SDT packet, not generate the termination data Example 1-20: An apparatus comprising means for performing a method of any of examples 1-1 to 1-18.

Example 1-21: A computer program product including a non-transitory computer-readable storage medium and storing executable code that, when executed by at least one data processing apparatus, is configured to cause the at least one data processing apparatus to perform a method of any of examples 1-1 to 1-18.

Example 2-1: FIG. 13 is a flow chart illustrating a method 1300. Operation 1310 includes transmitting, by a user equipment (UE) to a distributed unit of a base station (gNB-DU), one or more uplink (UL) small data transmission (SDT) packets of a multi-shot SDT transaction. Operation 1320 includes, after transmitting the one or more UL SDT packets, receive, from the gNB-DU, radio resource control release (RRC_RELEASE) data indicating that the multi-shot SDT transaction is terminated, the terminating of the multi-shot SDT transaction being determined by the gNB-DU.

Example 2-2: According to an example implementation of example 2-1, further comprising initiating the multi-shot SDT transaction in response to obtaining a payload in a buffer of the UE.

Example 2-3: According to an example implementation of example 2-2, further comprising transmitting an indication of a UE preference to terminate the multi-shot SDT transaction.

Example 2-4: According to an example implementation of any of examples 2-2 to 2-3, wherein transmitting the indication of the UE preference is transmitted in response to at least one of determining a last user plane data packet or determining that no further user plane data packets are expected over a subsequent time period Example 2-5: According to an example implementation of example 2-3, further comprising transmitting a buffer status report (BSR) with an UL SDT to the target gNB-DU, the BSR including an index indicating a condition by which a UL SDT data packet is determined to be a terminal UL SDT data packet, the condition indicating a termination of the multi-shot SDT transaction.

Example 2-6: According to an example implementation of example 2-5, wherein the index of the BSR indicates that there is no additional data in the buffer of the UE.

Example 2-7: According to an example implementation of example 2-6, wherein the indication is transmitted in a radio link channel (RLC) PDU.

Example 2-8: According to an example implementation of example 2-6, wherein the indication is transmitted in a media access channel (MAC) control element (CE).

Example 2-9: An apparatus comprising means for performing a method of any of examples 2-1 to 2-8.

Example 2-10: A computer program product including a non-transitory computer-readable storage medium and storing executable code that, when executed by at least one data processing apparatus, is configured to cause the at least one data processing apparatus to perform a method of any of examples 2-1 to 2-8

List of Example Abbreviations

AMF Access and Mobility Management Function
CP Control Plane
CU Centralized Unit
DU Distributed Unit
NR New Radio
gNB 5G Node B
I-RNTI Inactive Radio network temporary identifier
MAC-I Message Authentication Code for Integrity
NCC Next hop Chaining Count NG-RAN Next Generation-Radio Access Network
NR New Radio
UP User Plane
RAN Radio Access Network
RNA RAN Notification area
RNAU RAN Notification area Update
RRC Radio Resource Control protocol
SDT Small Data Transmission
UE User Equipment
UP user plane
Xn/Xn network interface Terms NR Cell Global Identifier (NCGI): used to identify NR cells globally. The NCGI is constructed from the PLMN identity the cell belongs to and the NR Cell Identity (NCI) of the cell.

gNB Identifier (gNB ID): used to identify gNBs within a PLMN. The gNB ID is contained within the NCI of its cells.

Global gNB ID: used to identify gNBs globally. The Global gNB ID is constructed from the PLMN identity the gNB belongs to and the gNB ID. The MCC and MNC are the same as included in the NCGI.

Global gNB ID=PLMN ID+gNB ID

Full I-RNTI: A full I-RNTI which has a length of 40 bits which can be included within a 64 bit RRCResumeRequest1 message over Common Control Channel 1

Figure 14:
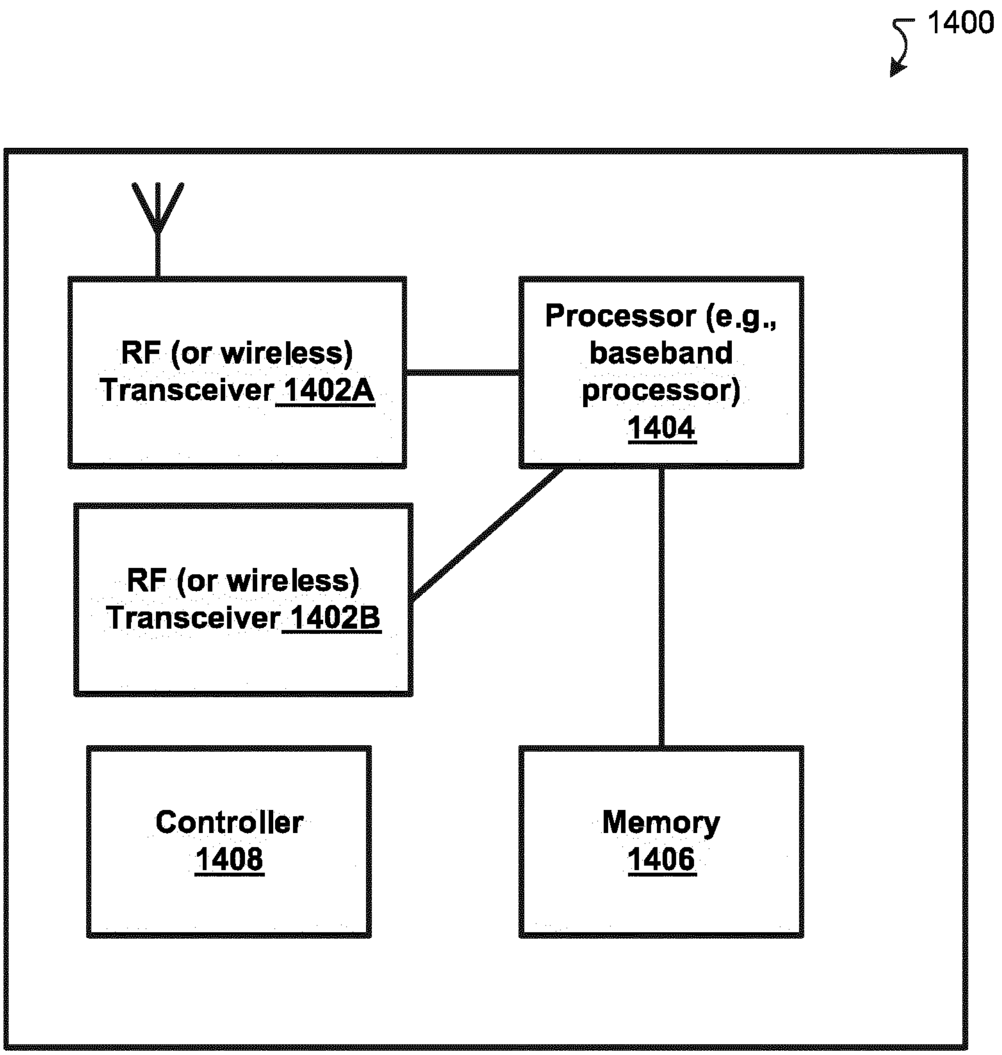
FIG. 14 is a block diagram of a node or wireless station (e.g., base station/access point, relay node, or mobile station/user device) according to an example implementation.

Short I-RNTI: A short I-RNTI which has a length of 24 bits which can be included within a 48 bit RRCResumeRequest message Common Control Channel FIG. 14 is a block diagram of a wireless station (e.g., AP, BS, eNB, UE or user device) 1400 according to an example implementation. The wireless station 1400 may include, for example, one or two RF (radio frequency) or wireless transceivers 1402A, 1402B, where each wireless transceiver includes a transmitter to transmit signals and a receiver to receive signals. The wireless station also includes a processor or control unit/entity (controller) 1404 to execute instructions or software and control transmission and receptions of signals, and a memory 1406 to store data and/or instructions.

Processor 1404 may also make decisions or determinations, generate frames, packets or messages for transmission, decode received frames or messages for further processing, and other tasks or functions described herein. Processor 1404, which may be a baseband processor, for example, may generate messages, packets, frames or other signals for transmission via wireless transceiver 1402 (1402A or 1402B). Processor 1404 may control transmission of signals or messages over a wireless network, and may control the reception of signals or messages, etc., via a wireless network (e.g., after being down-converted by wireless transceiver 1402, for example). Processor 1404 may be programmable and capable of executing software or other instructions stored in memory or on other computer media to perform the various tasks and functions described above, such as one or more of the tasks or methods described above. Processor 1404 may be (or may include), for example, hardware, programmable logic, a programmable processor that executes software or firmware, and/or any combination of these. Using other terminology, processor 1404 and transceiver 1402 together may be considered as a wireless transmitter/receiver system, for example.

In addition, referring to FIG. 14, a controller (or processor) 1408 may execute software and instructions, and may provide overall control for the station 1400, and may provide control for other systems not shown in FIG. 14, such as controlling input/output devices (e.g., display, keypad), and/or may execute software for one or more applications that may be provided on wireless station 1400, such as, for example, an email program, audio/video applications, a word processor, a Voice over IP application, or other application or software.

In addition, a storage medium may be provided that includes stored instructions, which when executed by a controller or processor may result in the processor 1404, or other controller or processor, performing one or more of the functions or tasks described above.

According to another example implementation, RF or wireless transceiver(s) 1402A/1402B may receive signals or data and/or transmit or send signals or data. Processor 1404 (and possibly transceivers 1402A/1402B) may control the RF or wireless transceiver 1402A or 1402B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus, comprising:

at least one processor; and at least one memory storing instructions that, when executed by the at least one processor, cause the apparatus at least to:

receive, by a distributed unit of a target base station from a user equipment within a wireless network, during a multi-shot small data transmission transaction, an uplink multi-shot small data transmission packet;

determine whether the uplink multi-shot small data transmission packet is a terminal uplink multi-shot small data transmission packet; in response to the determination that the uplink multi-shot small data transmission packet is the terminal uplink multi-shot small data transmission packet, generate termination data indicating a termination of the multi-shot small data transmission transaction; and transmit the termination data to a central unit of a base station along a path within the wireless network, the termination data indicating a termination of the multi-shot small data transmission transaction, wherein the base station is an anchor base station different from the target base station, the anchor base station being a last serving base station for the user equipment, and wherein the path within the wireless network terminates at a control plane of a central unit of the anchor base station via a control plane of a central unit of the target base station.

2. The apparatus as in claim 1, wherein the at least one memory and the computer program code are further configured to cause the apparatus at least to:

after transmitting the termination data, receiving, from the control plane of the central unit of the anchor base station via the control plane of the central unit of the target base station within an XnAP message, radio resource control release data indicating that the multi-shot small data transmission transaction is closed; and transmitting the radio resource control release data to the user equipment.

3. The apparatus as in claim 1, wherein the determining whether the uplink multi-shot small data transmission packet is a terminal uplink multi-shot small data transmission packet is based on at least one of:

the buffer status report data received from the user equipment, wherein the buffer status report data including an index indicating a condition by which an uplink multi-shot small data transmission packet is determined to be a terminal uplink multi-shot small data transmission packet, or a threshold elapse of time since a previous uplink multi-shot small data transmission packet was received.

4. The apparatus as in claim 1, wherein the base station is an anchor base station different from the target base station, the anchor base station being a last serving base station for the user equipment, and wherein the path within the wireless network terminates at the anchor base station central unit control plane via the anchor base station central unit user plane.

5. The apparatus as in claim 4, wherein the at least one memory and the computer program code are further configured to cause the apparatus at least to:

receive downlink data from the anchor base station central unit user plane;

receive, from the anchor base station central unit control plane, radio resource control release data indicating that the multi-shot small data transmission transaction is closed; and transmit the radio resource control release data to the user equipment after transmitting a downlink data packet.

6. The apparatus as in claim 1, wherein the base station is the target base station, and wherein the path within the wireless network terminates at a control plane of the central unit of the target base station via the target base station central unit user plane.

7. The apparatus as in claim 6, wherein the at least one memory storing instructions that, when executed by the at least one processor, cause the apparatus at least to:

after determining that a uplink multi-shot small data transmission packet is the terminal uplink multi-shot small data transmission packet, receive, from the target base station central unit control plane, radio resource control release data indicating that the multi-shot small data transmission transaction is terminated; and transmit the radio resource control release data to the user equipment.

8. The apparatus as in claim 1, wherein the base station is the target base station, and wherein the path within the wireless network terminates at the target base station central unit control plane directly from the distributed unit of the target base station.

9. The apparatus as in claim 8, wherein the at least one memory storing instructions that, when executed by the at least one processor, cause the apparatus at least to:

receive downlink data from the target base station central unit user plane;

receive, from the target base station central unit control plane, radio resource control release radio resource control release data indicating that the multi-shot small data transmission transaction is terminated; and after transmitting the received DL downlink data packet, transmit the radio resource control release data to the user equipment UE.

10. The apparatus as in claim 8, wherein the at least one memory and the computer program code are further configured to cause the apparatus at least to:

after receiving an initial uplink multi-shot small data transmission packet of the transaction, receive, from a control plane of a central unit of the target base station, data representing a path by which the termination data is transmitted within the wireless network.

11. The apparatus as in claim 8, wherein the at least one memory and the computer program code are further configured to cause the apparatus at least to:

receive an inactive radio network temporary user equipment identifier;

generate a temporary user equipment context based on the above UE user equipment identifier; and store the temporary user equipment context for a duration of the multi-shot small data transmission transaction.

12. The apparatus as in claim 11, wherein the at least one memory and the computer program code are further configured to cause the apparatus at least to:

receive, from the target base station central unit control plane, radio resource control release data indicating that the multi-shot small data transmission transaction is terminated;

transmit the radio resource control release data to the user equipment; and after transmitting the radio resource control release data to the user equipment, discarding the temporary user equipment context.

13. An apparatus, comprising:

at least one processor; and at least one memory storing instructions that, when executed by the at least one processor, cause the apparatus at least to:

transmit, by a user equipment to a distributed unit of a base station, one or more uplink multi-shot small data transmission packets of a multi-shot small data transmission transaction; and after transmitting the one or more of multi-shot uplink multi-shot small data transmission packets, receive, from the the distributed unit of the base station, radio resource control release data indicating that the multi-shot small data transmission transaction is terminated, the terminating of the multi-shot small data transmission transaction being determined by the distributed unit of the base station.

14. The apparatus as in claim 13, wherein the at least one memory storing instructions that, when executed by the at least one processor, cause the apparatus at least to:

initiate the multi-shot small data transmission transaction in response to obtaining a user plane packet in a buffer of the user equipment;

transmit an indication of a user equipment preference to terminate the multi-shot small data transmission transaction.

15. The apparatus as in claim 14, wherein the at least one memory storing instructions that, when executed by the at least one processor, cause the apparatus at least to:

transmit a buffer status report with an uplink multi-shot small data transmission to the distributed unit of the target base station, the buffer status report including an index indicating a condition by which a uplink multi-shot small data transmission packet is determined to be a terminal uplink multi-shot small data transmission packet, the condition indicating a termination of the multi-shot small data transmission transaction, wherein the indication is transmitted in a radio link channel protocol data unit or in a media access channel control element.

16. An apparatus, comprising:

at least one processor; and at least one memory storing instructions that, when executed by the at least one processor, cause the apparatus at least to:

receive, by an anchor base station central unit, control plane, termination data indicating an end of a small data transmission transaction; and generate an radio resource control release data; and transmit, to a user equipment, the radio resource control release data.

17. The apparatus as in claim 16, wherein the at least one memory storing instructions that, when executed by the at least one processor, cause the apparatus to:

receive the termination data are further configured to cause the apparatus at least to receive the termination data from at least one of a target base station central unit control plane or an anchor base station central unit user plane;

transmit the radio resource control release data are further configured to cause the apparatus at least to transmit the radio resource control release data over at least one of an XnAP message to a target base station central control plane.

18. The apparatus as in claim 16, wherein the at least one memory storing instructions that, when executed by the at least one processor, cause the apparatus to at least perform one of the following:

receive, at a target base station central unit control plane, termination data indicating an end of multi-shot small data transmission transaction, and generate and transmit radio resource control release data to a user equipment, or receive, at a target base station central unit control plane, termination data indicating an end of multi-shot small data transmission transaction and propagate the termination data to an anchor base station central unit control plane, or receive the termination data from a base station distributed unit.

19. The apparatus as in claim 16, wherein the at least one memory storing instructions that, when executed by the at least one processor, cause the apparatus to transmit the radio resource control release data are further configured to cause the apparatus at least to:

transmit the radio resource control release data over an F1-C message to the distributed units.

* * * * *